US012290868B2

United States Patent
Aoki

(10) Patent No.: US 12,290,868 B2
(45) Date of Patent: May 6, 2025

(54) POWER TOOL

(71) Applicant: MAKITA CORPORATION, Anjo (JP)

(72) Inventor: Yonosuke Aoki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 4 days.

(21) Appl. No.: 18/135,508

(22) Filed: Apr. 17, 2023

(65) Prior Publication Data

US 2023/0249269 A1 Aug. 10, 2023

Related U.S. Application Data

(62) Division of application No. 16/953,733, filed on Nov. 20, 2020, now Pat. No. 11,660,690.

(30) Foreign Application Priority Data

Nov. 28, 2019 (JP) .................................. 2019-215842
Nov. 28, 2019 (JP) .................................. 2019-215843

(Continued)

(51) Int. Cl.
| | | |
|---|---|---|
| *B23D 61/00* | (2006.01) | |
| *B24B 23/04* | (2006.01) | |
| *B26D 1/00* | (2006.01) | |

(52) U.S. Cl.
CPC ............ *B23D 61/006* (2013.01); *B24B 23/04* (2013.01); *B26D 2001/004* (2013.01); *B26D 2001/006* (2013.01)

(58) Field of Classification Search
CPC ........ B26D 2001/006; B26D 2001/004; B24B 23/04; B23D 61/006
See application file for complete search history.

(56) References Cited

U.S. PATENT DOCUMENTS 3,233,908 A 2/1966 Walter et al.
3,622,170 A 11/1971 Sedgwick
(Continued)

FOREIGN PATENT DOCUMENTS

DE 29605728 U1 9/1996
DE 102005047400 12/2006
(Continued)

OTHER PUBLICATIONS

Office Action from the Japanese Patent Office dispatched Jun. 27, 2023 in related Japanese application No. 2019-215844, and machine translation thereof.

(Continued)

*Primary Examiner* — Liang Dong
(74) *Attorney, Agent, or Firm* — J-TEK LAW PLLC; Jeffrey D. Tekanic; Scott T. Wakeman

(57) ABSTRACT

A power tool, such as an oscillating multi-tool, is configured to drive a tool accessory in an oscillating manner. The power tool includes a motor, and a spindle supported to be rotatable around a driving axis and configured to pivotally oscillate the tool accessory, which is removably mounted on the spindle, using power generated by the motor. An inner housing of the power tool houses the motor and the spindle, and has at least one airflow inlet and at least one airflow outlet. An outer housing of the power tool houses the inner housing and is elastically connected to the inner housing via at least one elastic member to be movable relative to the inner housing. A partition is disposed between the at least one inlet and the at least one outlet. The partition divides a space defined between the inner and outer housings into first and second airflow spaces.

20 Claims, 16 Drawing Sheets

(30) Foreign Application Priority Data

Nov. 28, 2019 (JP) ................................ 2019-215844
Jul. 13, 2020 (JP) ................................ 2020-120254

(56) References Cited

U.S. PATENT DOCUMENTS

| | | | |
|---|---|---|---|
| 3,998,467 | A | 12/1976 | Petkovich |
| 4,205,572 | A | 6/1980 | Weiner |
| 4,237,659 | A | 12/1980 | Welsch et al. |
| 4,597,227 | A | 7/1986 | Gentischer et al. |
| 4,747,607 | A | 5/1988 | Emter |
| 4,989,374 | A | 2/1991 | Rudolf et al. |
| 5,031,361 | A | 7/1991 | MacKay, Jr. |
| 5,157,873 | A | 10/1992 | Rudolf et al. |
| 5,263,283 | A | 11/1993 | Rudolf et al. |
| 5,423,358 | A | 6/1995 | Rautio |
| 5,468,176 | A | 11/1995 | Udert et al. |
| 5,573,255 | A | 11/1996 | Salpaka |
| 5,575,071 | A | 11/1996 | Phillips et al. |
| 5,601,483 | A | 2/1997 | Rudolf et al. |
| 5,639,273 | A | 6/1997 | Sjolander et al. |
| 5,658,193 | A | 8/1997 | McCambridge |
| 5,727,994 | A | 3/1998 | Sjolander et al. |
| 5,759,093 | A | 6/1998 | Rodriguez |
| 5,919,085 | A | 7/1999 | Izumisawa |
| 5,946,810 | A | 9/1999 | Hoelderlin et al. |
| 6,142,858 | A | 11/2000 | Luedeke |
| 6,244,943 | B1 | 6/2001 | Böhler et al. |
| 6,569,001 | B2 | 5/2003 | Rudolf et al. |
| 6,612,039 | B2 | 9/2003 | Kakiuchi et al. |
| 6,623,202 | B2 | 9/2003 | Hansson et al. |
| 6,735,876 | B2 | 5/2004 | Hirabayashi |
| 6,796,888 | B2 | 9/2004 | Jasch |
| 6,860,792 | B2 | 3/2005 | Krondorfer et al. |
| 6,887,142 | B2 | 5/2005 | Rupprecht et al. |
| 6,910,694 | B2 | 6/2005 | Hartmann et al. |
| 7,344,435 | B2 | 3/2008 | Pollak et al. |
| 7,497,860 | B2 | 3/2009 | Carusillo et al. |
| 7,537,065 | B2 | 5/2009 | Gallagher et al. |
| 7,719,146 | B2 | 5/2010 | Takahashi et al. |
| 7,789,737 | B2 | 9/2010 | Liersch |
| 7,997,586 | B2 | 8/2011 | Ziegler et al. |
| 8,042,437 | B2 | 10/2011 | Maier et al. |
| 8,113,520 | B2 | 2/2012 | Zaiser et al. |
| 8,181,973 | B2 | 5/2012 | Dezheng et al. |
| 8,182,316 | B2 | 5/2012 | Peisert |
| 8,187,058 | B2 | 5/2012 | Blickle et al. |
| 8,272,135 | B2 | 9/2012 | Zhou |
| 8,317,574 | B2 | 11/2012 | Blickle et al. |
| 8,641,049 | B2 | 2/2014 | Marini et al. |
| 8,851,960 | B2 | 10/2014 | Ikuta |
| 8,895,880 | B2 | 11/2014 | Mizutani et al. |
| 9,073,563 | B2 | 7/2015 | Middleton et al. |
| 9,108,255 | B2 | 8/2015 | Li |
| 9,120,216 | B2 | 9/2015 | Zhang et al. |
| 9,221,156 | B2 | 12/2015 | Bachman et al. |
| 9,555,554 | B2 | 1/2017 | Thorson et al. |
| 9,737,969 | B2 | 8/2017 | Bek et al. |
| 10,213,852 | B2 | 2/2019 | Qian et al. |
| 11,590,593 | B2 | 2/2023 | Aoki |
| 2001/0023538 | A1 | 9/2001 | Muraguchi et al. |
| 2002/0035882 | A1 | 3/2002 | Hartmann |
| 2002/0070037 | A1 | 6/2002 | Jasch |
| 2002/0170408 | A1 | 11/2002 | Hartmann et al. |
| 2002/0175573 | A1 | 11/2002 | Hayashi |
| 2003/0100251 | A1 | 5/2003 | Besch |
| 2005/0075059 | A1 | 4/2005 | Kausch et al. |
| 2005/0095966 | A1 | 5/2005 | Jasch et al. |
| 2005/0156390 | A1 | 7/2005 | Marini et al. |
| 2006/0172669 | A1 | 8/2006 | Hesse et al. |
| 2007/0060030 | A1 | 3/2007 | Pollak et al. |
| 2007/0082590 | A1 | 4/2007 | Kraenzler et al. |
| 2007/0295156 | A1 | 12/2007 | Ziegler et al. |
| 2009/0023371 | A1 | 1/2009 | Blickle et al. |
| 2009/0273146 | A1 | 11/2009 | Dezheng et al. |
| 2010/0197208 | A1 | 8/2010 | Blickle et al. |
| 2010/0236806 | A1 | 9/2010 | Heilig et al. |
| 2011/0074122 | A1 | 3/2011 | Marini et al. |
| 2011/0086582 | A1 | 4/2011 | Takemura et al. |
| 2011/0171887 | A1 | 7/2011 | Tanimoto et al. |
| 2011/0316241 | A1 | 12/2011 | Zhang et al. |
| 2011/0316242 | A1 | 12/2011 | Zhang et al. |
| 2012/0067607 | A1 | 3/2012 | Weber et al. |
| 2012/0139196 | A1 | 6/2012 | Zhou |
| 2012/0169018 | A1 | 7/2012 | Lu et al. |
| 2013/0047762 | A1 | 2/2013 | Hecht et al. |
| 2013/0193653 | A1 | 8/2013 | Marini et al. |
| 2014/0084552 | A1 | 3/2014 | Zieger et al. |
| 2014/0190715 | A1 * | 7/2014 | Wong ............... B24B 23/04 173/39 |
| 2014/0191481 | A1 | 7/2014 | Kawakami et al. |
| 2014/0290072 | A1 | 10/2014 | Brown et al. |
| 2015/0042052 | A1 | 2/2015 | Furusawa et al. |
| 2016/0184956 | A1 | 6/2016 | Klabunde et al. |
| 2016/0199919 | A1 | 7/2016 | Klabunde et al. |
| 2016/0221175 | A1 | 8/2016 | Aoki |
| 2016/0271711 | A1 | 9/2016 | Qian et al. |
| 2016/0288288 | A1 | 10/2016 | Klabunde et al. |
| 2017/0008160 | A1 | 1/2017 | Simma |
| 2017/0050291 | A1 | 2/2017 | Aoki |
| 2017/0080545 | A1 | 3/2017 | Furusawa et al. |
| 2017/0129123 | A1 | 5/2017 | Thorson et al. |
| 2017/0239802 | A1 | 8/2017 | Aoki |
| 2017/0239803 | A1 | 8/2017 | Aoki |
| 2017/0259348 | A1 | 9/2017 | Scott et al. |
| 2018/0243894 | A1 | 8/2018 | Wang et al. |
| 2018/0283508 | A1 * | 10/2018 | Aoki ............... B25F 5/02 |
| 2018/0319001 | A1 | 11/2018 | Zhong et al. |
| 2019/0030616 | A1 | 1/2019 | Hess et al. |
| 2019/0047115 | A1 * | 2/2019 | Nakamura ........... B25F 5/02 |
| 2019/0168372 | A1 | 6/2019 | Aoki et al. |
| 2019/0299387 | A1 | 10/2019 | Kotsuji et al. |
| 2019/0358769 | A1 * | 11/2019 | Miyazawa ........... B25F 5/02 |
| 2021/0094164 | A1 * | 4/2021 | Numata ............. B25F 5/008 |
| 2021/0162525 | A1 | 6/2021 | Aoki |
| 2021/0162526 | A1 | 6/2021 | Aoki |
| 2021/0362289 | A1 | 11/2021 | Nakayama et al. |
| 2023/0173599 | A1 | 6/2023 | Aoki |

FOREIGN PATENT DOCUMENTS

| | | |
|---|---|---|
| DE | 102005031802 A1 | 1/2007 |
| DE | 202010014781 U1 | 12/2010 |
| DE | 102011005021 A1 | 9/2012 |
| DE | 102011005818 A1 | 9/2012 |
| EP | 1790434 A1 | 5/2007 |
| EP | 1790434 B1 | 3/2008 |
| EP | 1737616 B1 | 12/2011 |
| JP | S61029100 U | 2/1986 |
| JP | H08309677 A | 11/1996 |
| JP | 2000175847 A | 6/2000 |
| JP | 2001239078 A | 9/2001 |
| JP | 2002354745 A | 12/2002 |
| JP | 2016144862 A | 8/2016 |
| JP | 2016529118 A | 9/2016 |
| JP | 2017039180 A | 2/2017 |
| JP | 2017144537 A | 8/2017 |
| JP | 2017144538 A | 8/2017 |
| JP | 2017144539 A | 8/2017 |
| JP | 2019098464 A | 6/2019 |
| WO | 2012007203 A1 | 1/2012 |
| WO | 2016121448 A1 | 8/2016 |
| WO | 2020054616 A1 | 3/2020 |

OTHER PUBLICATIONS

Notice of Allowance from the United States Patent Office mailed Nov. 7, 2022 in related U.S. Appl. No. 16/953,796.

Office Action from the United States Patent Office mailed Jun. 13, 2022 in related U.S. Appl. No. 16/953,796, including examined claims 1-20.

Unpublished U.S. Appl. No. 18/101,245, inventor: Yonosuke Aoki, filed Jan. 25, 2023.

(56) References Cited

OTHER PUBLICATIONS

Office Action and Search Report from the Japanese Patent Office dispatched Jan. 9, 2024 in related application No. JP 2020-120254, and translation thereof.
Office Action and Search Report from the Japanese Patent Office dispatched Jan. 9, 2024 in related application No. JP 2020-120255, and translation thereof.
Office Action and Search Report from the Japanese Patent Office dispatched Jan. 9, 2024 in related application No. JP 2020-120256, and translation thereof.
Office Action from the United States Patent Office mailed Dec. 6, 2023 in related U.S. Appl. No. 18/101,245, including examined claims 20-34.
Office Action mailed Jul. 11, 2024, in U.S. Appl. No. 18/101,245, and examined claims 20-22 and 24-40.

\* cited by examiner

POWER TOOL

CROSS-REFERENCE TO RELATED APPLICATIONS

The present application is a divisional application of U.S. patent application Ser. No. 16/953,733 filed on Nov. 20, 2020, now U.S. Pat. No. 11,660,690, which claims priority to Japanese patent application Nos. 2019-215842, 2019-215843 and 2019-215844, all of which were filed on Nov. 28, 2019, and to Japanese patent application No. 2020-120254 filed on Jul. 13, 2020. The contents of all of the foregoing applications are hereby fully incorporated herein by reference.

TECHNICAL FIELD

The present disclosure relates to a power tool that is configured to drive (pivot) a tool accessory in an oscillating manner to thereby perform an operation, such as cutting, sanding, scraping, etc., on a workpiece.

BACKGROUND

Known power tools (e.g., oscillating multi-tools, which are also known in the power tool field as "multi-tool") are configured to drive a tool accessory coupled to a spindle in a pivotal oscillating manner within a specified angle range. In some of these known oscillating multi-tools, the spindle and the tool accessory have complementary contact surfaces that are inclined (oblique) with respect to a rotational axis of the spindle for the purpose of reliably absorbing torque applied to the tool accessory.

SUMMARY

In one aspect of the present disclosure, a power tool is configured to drive (pivot) a tool accessory in an oscillating manner. The power tool may include, e.g., a housing, a spindle, a clamp shaft (or clamping shaft), a first biasing member (e.g., a spring), an engagement member (e.g., one or more chuck jaws), a first holding member (e.g., a collar), a manually operable member (e.g., a manually operable lever) and a push-down member or pusher. The spindle is preferably hollow cylindrical. The spindle is supported by the housing to be rotatable (pivotable) around a driving axis that defines or is parallel to an up-down direction of the power tool. A tool mounting part or tool mounting surface is defined at the lower end portion of the spindle. The clamp shaft is coaxially disposed with the spindle (e.g., within or inside the hollow interior of the spindle) and is configured to be removable (separable) from the spindle. The first biasing member is configured to bias the clamp shaft upward toward a clamp position (or clamping position), in (at) which a lower end portion (e.g., a clamping head) of the clamp shaft and the tool mounting part clamp the tool accessory therebetween. The engagement member is configured to engage with and/or press against the clamp shaft and thereby hold the clamp shaft in the clamp position. The first holding member holds the engagement member such that the engagement member is movable (relative to the first holding member) between a first (vertical) position and a second (vertical) position in the up-down direction. When the engagement member is in the first position, the engagement member is engageable with and/or pressed against the clamp shaft and is immovable in a radial direction that is perpendicular to the driving axis. When the engagement member is in the second position, the engagement member is movable in the radial direction. The manually operable member is configured to be externally manipulated by a user. The push-down member is movable in the up-down direction relative to the spindle. The tool mounting part may have a first inclined surface (e.g., a truncated cone-shaped surface) that is inclined (oblique) relative to the driving axis and against which a second inclined surface (e.g., a complementary truncated cone-shaped surface) of the tool accessory is pressed when the tool accessory is clamped. In response to a manual unclamping operation being performed on the manually operable member by the user, a first one of the engagement member or the first holding member is moved downward relative to the spindle and relative to a second (i.e. other) one of the engagement member or the first holding member. The engagement member is configured to move from the first position to the second position relative to the first holding member in response to the manual unclamping operation. The first one of the engagement member and the first holding member is configured to push down the tool accessory via the push-down member in the process of moving downward.

In such a power tool, the first one of the engagement member and the first holding member is moved downward relative to the second one in response to the manual unclamping operation. Thus, the engagement member moves to the second position and is allowed to be disengaged (released, separated) from the clamp shaft. Further, the first one of the engagement member and the first holding member pushes down the tool accessory via the push-down member in the process of moving downward. Therefore, even if the tool accessory sticks (adheres) to the tool mounting part along the first and second inclined surfaces, the user can easily remove the tool accessory from the spindle together with the clamp shaft, by simply performing the unclamping operation on the manually operable member.

DETAILED DESCRIPTION OF THE EMBODIMENTS

Oscillating tools (multi-tool) 1 according to non-limiting, representative embodiments of the present teachings will now be described. The oscillating multi-tools 1 shown in the Figures are exemplary examples of an electric power tool that is configured to perform an operation on a workpiece (not shown) by driving (pivoting) a tool accessory 91 in an oscillating manner within a specified angular range, e.g., that is less than 5°.

Figure 1:
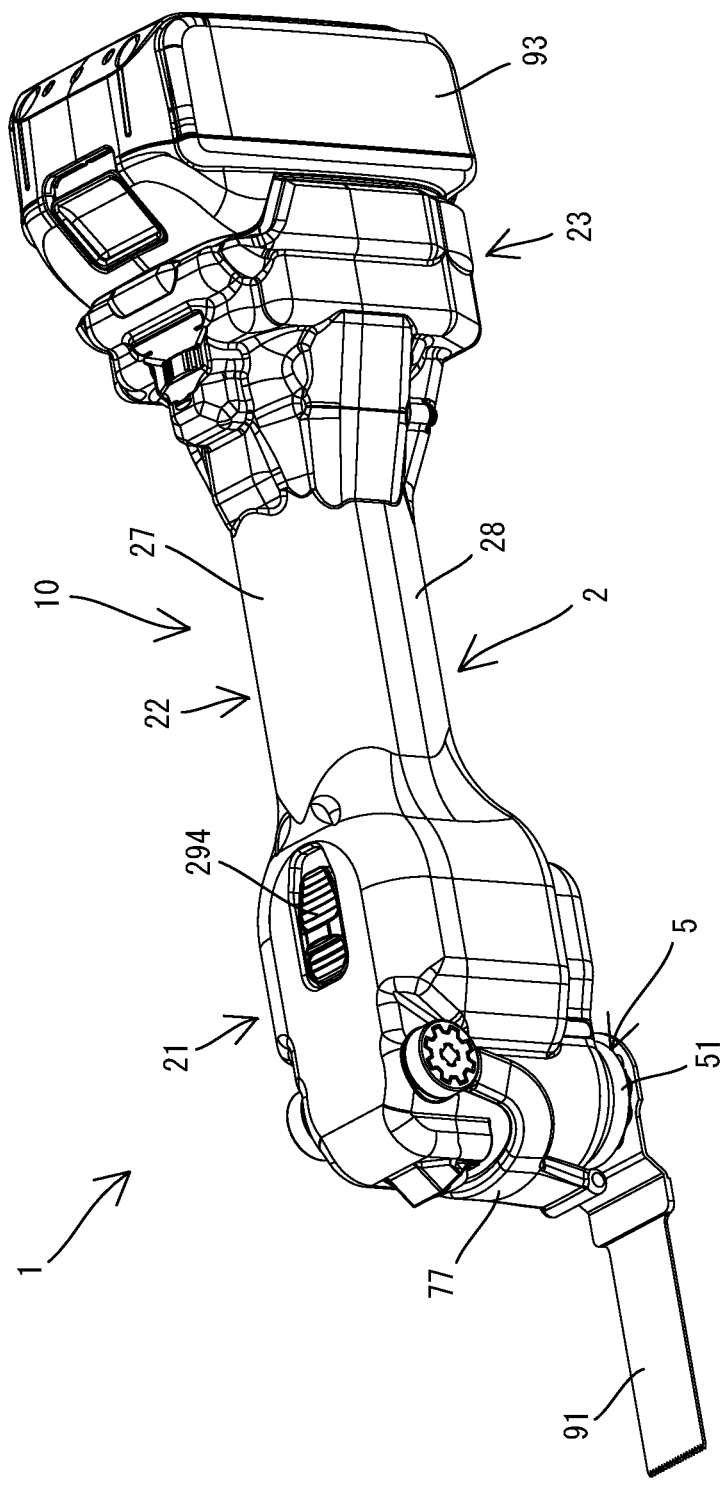
FIG. 1 is a perspective view showing a representative, non-limiting oscillating multi-tool (multi-tool) according to one exemplary embodiment of the present teachings, wherein a lever is in a front position.
Figure 2:
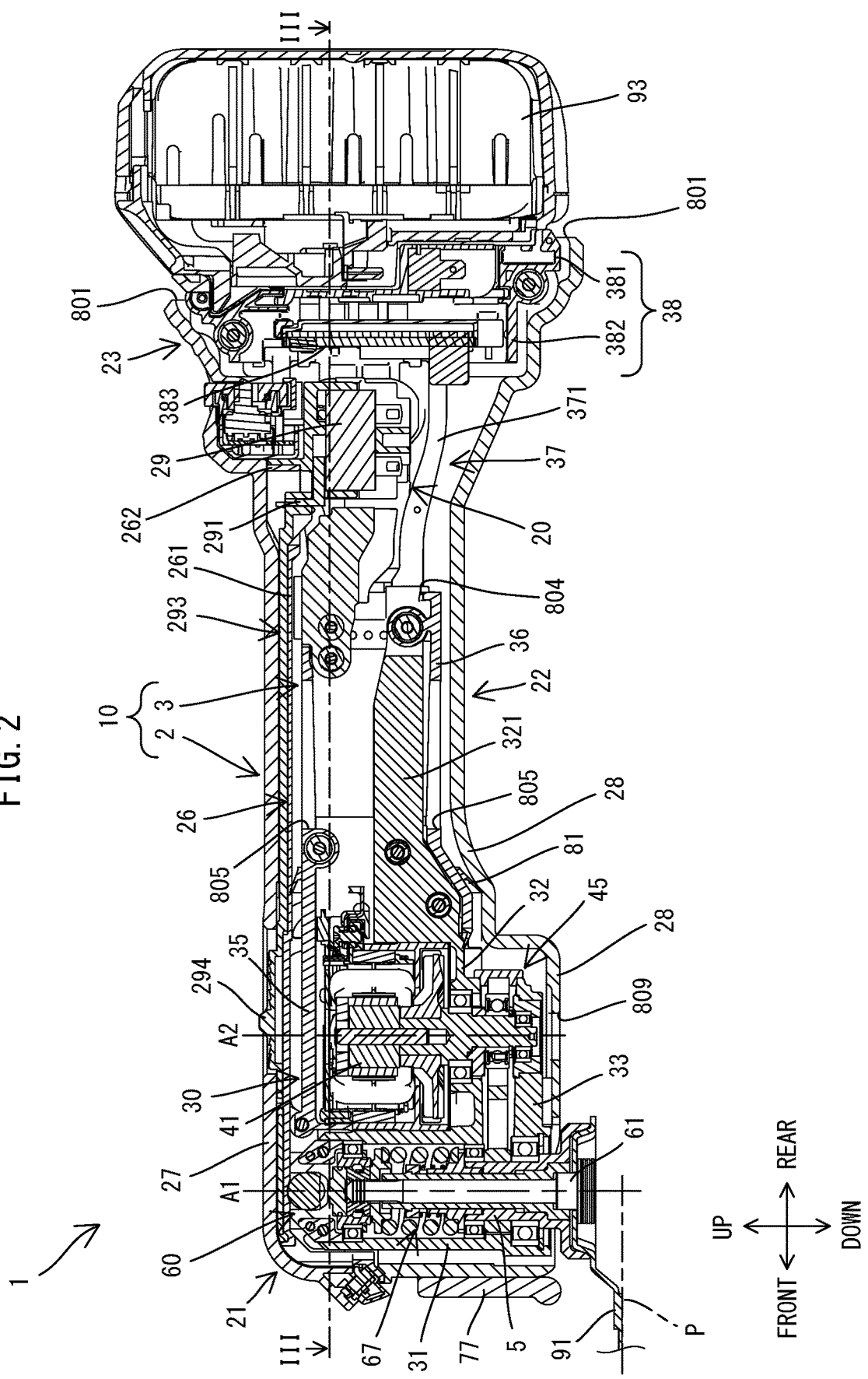
FIG. 2 is a sectional view of the oscillating multi-tool.

First, the general structure of the oscillating multi-tool 1 shown in FIGS. 1-14 is described. As shown in FIGS. 1 and 2, the oscillating multi-tool 1 has an elongate housing (also referred to as a tool body) 10. An elongate spindle 5 and a motor 41, which serves as a driving source, are housed in one end portion of the housing 10 in its longitudinal direction. The spindle 5 is arranged such that a longitudinal axis of the spindle intersects (more specifically, at least substantially orthogonally intersects) a longitudinal axis of the housing 10. One (lower) axial end portion of the spindle 5 protrudes from the housing 10 and is exposed outside of the housing 10. This lower axial end portion of the spindle 5 forms (defines) a tool mounting part 51, to (on) which the tool accessory 91 is removably mounted. Further, a battery (battery pack, battery cartridge) 93 for supplying electric power to the motor 41 is removably mounted to the other end portion of the housing 10 in the longitudinal direction. In the oscillating multi-tool 1, the spindle 5 is driven about a driving axis A1 with a rotary (pivotal) oscillating motion within a specified angle range, using power generated by the motor 41, and thereby oscillates the tool accessory 91 in an oscillation plane P.

For the sake of convenience in the following description, the directions of the oscillating multi-tool 1 are related in the following manner. An extension direction of the driving axis A1 is defined as an up-down direction. In the up-down direction, the side on which the tool mounting part 51 of the spindle 5 is located is defined as a lower side of the oscillating multi-tool 1, while the opposite side is defined as an upper side of the oscillating multi-tool 1. A direction that is orthogonal to the driving axis A1 and that corresponds to the longitudinal direction of the housing is defined as a front-rear direction of the oscillating multi-tool 1. In the front-rear direction, the side of one end portion of the housing 10 in which the spindle 5 is housed is defined as a front side of the oscillating multi-tool 1, while the side of the other end portion to (on) which the battery 93 is mounted is defined as a rear side of the oscillating multi-tool 1. Further, a direction that is orthogonal to both the up-down direction and the front-rear direction is defined as a left-right direction.

The structure of the oscillating multi-tool 1 is now described in further detail.

Figure 3:
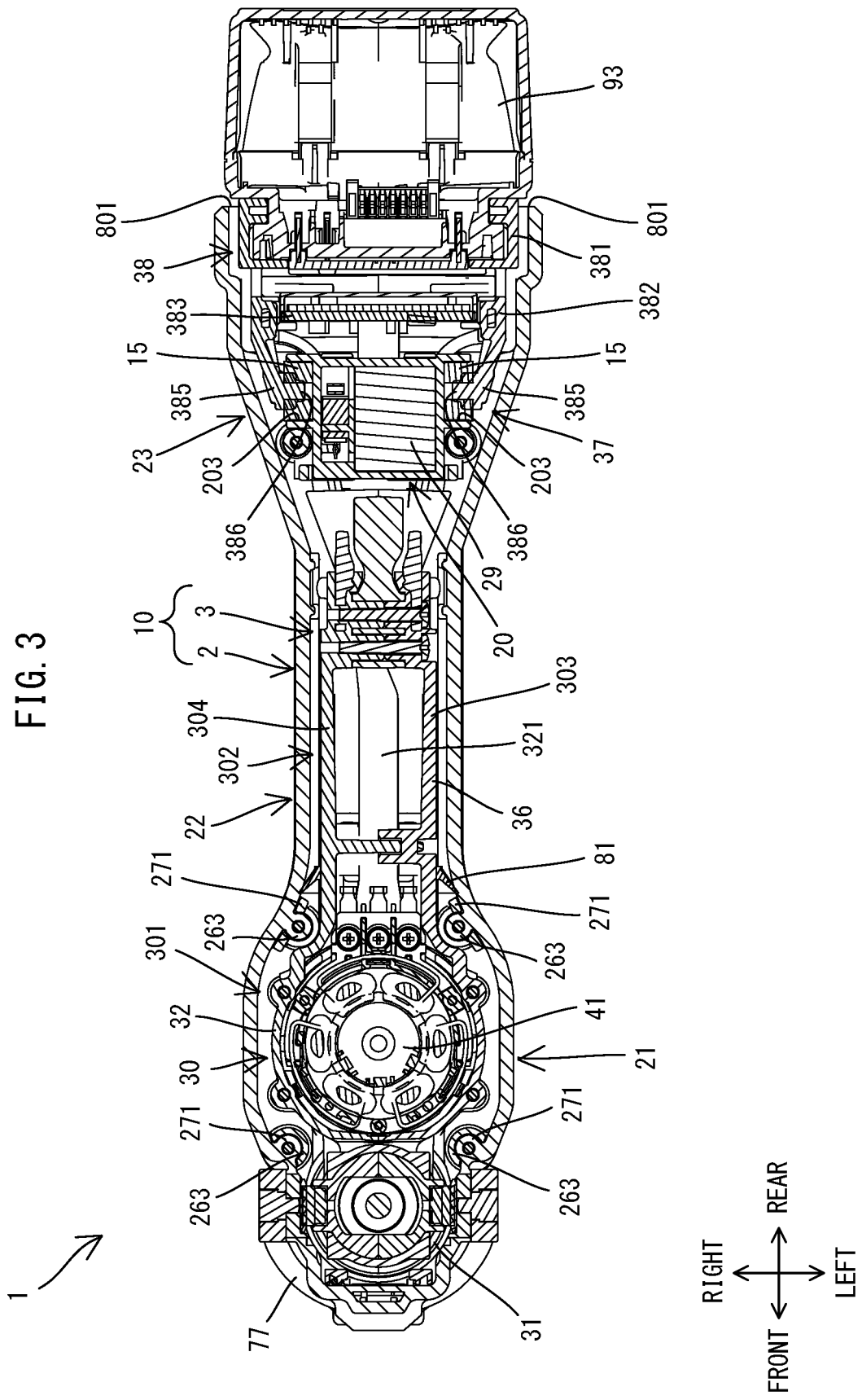
FIG. 3 is a sectional view taken along line III-III in FIG. 2 (wherein a tool accessory is omitted for the purposes of clarity).

First, the housing 10 is described. As shown in FIGS. 1 to 3, the housing 10 of this embodiment is configured as a so-called vibration-isolating housing. The housing 10 includes an elongate outer housing 2, which forms an outer shell of the oscillating multi-tool 1, and an elongate inner housing 3, which is housed in (surrounded by) the outer housing 2.

In this embodiment, the outer housing 2 is formed by connecting an upper shell (upper housing half) 27, a lower shell (lower housing half) 28 and a switch holder 20 that are each formed separately from each other. Each of the upper shell 27, the lower shell 28 and the switch holder 20 is a member (structure, component) that is integrally molded from synthetic resin/polymer. Although not shown in detail, the outer housing 2 is formed by fitting (mating) the upper shell 27 and the lower shell 28 together in the up-down direction with the switch holder 20 disposed therebetween and connecting them by screws at multiple positions.

In relation to the front-rear direction, the outer housing 2 includes a front part 21, a rear part 23 and a central part 22 connecting the front part 21 and the rear part 23.

The front part 21 has a generally rectangular box-like shape. A front part 30 of the inner housing 3 is disposed in the front part 21. A lever 77 is rotatably (pivotably) supported by (at) an upper front end portion of the front part 21. The lever 77 is a manually operable member (manipulation member) for securing (locking, clamping) the tool accessory 91 and for releasing (unlocking, unclamping) the tool accessory 91 via a lock mechanism 6, which will be described below (see FIG. 7). Further, an opening is provided in an upper wall of the front part 21. A slide operation (manipulation) part (slide switch or switch knob) 294 is exposed to the outside through this opening, so that a user can manipulate (slide) the operation part 294. The operation part 294 is a manually operable (slidable) member (manipulation member) for switching ON and OFF a switch 29 for starting the motor 41.

The rear part 23 has a tubular shape having a sectional area increasing toward the rear. An elastic connection part 37 and a rear part 38 of the inner housing 3 are disposed within the rear part 23.

The central part 22 has a tubular shape. The central part 22 linearly extends in the front-rear direction. The central part 22 forms a grip part configured to be held by the user. Therefore, the central part 22 is narrower (i.e. has a smaller diameter or cross-section) than the front part 21 and the rear part 23 so as to be easy to hold (grasp) with one hand.

As shown in FIGS. 2 to 6, in this embodiment, the inner housing 3 is formed by connecting a metal housing 301 and a plastic housing 302 that are formed separately from each other. The metal housing 301 is a single (integral) metal member (structure, component), i.e. there are no seams between the various portions thereof; it may be, e.g., a cast metal part, a machined metal part, or a 3-D printed metal part. The plastic housing 302 is formed by connecting a left shell 303 and a right shell 304 that are formed of synthetic resin/polymer. The inner housing 3 is formed by connecting the left shell 303, the right shell 304 and the metal housing 301 by screws at multiple positions, with a rear end portion (a connecting part 321 to be described below) of the metal housing 301 held between the left shell 303 and the right shell 304 in the left-right direction.

Further, in relation to the front-rear direction, the inner housing 3 includes the front part 30, an extending part 36, the elastic connection part 37 and the rear part 38.

The front part 30 houses the spindle 5, the motor 41 and a transmitting mechanism (rotation-to-oscillating motion converting mechanism) 45. The front part 30 includes a first housing part 31, a second housing part 32, the connecting part 321, a third housing part 33 and a cover part 35. The metal housing 301 is formed by the above-mentioned parts of the front part 30 other than the cover part 35 (that is, the metal housing 301 is formed by the first housing part 31, the second housing part 32, the connecting part 321 and the third housing part 33). The plastic housing 302 is formed by the cover part 35, the extending part 36, the elastic connection part 37 and the rear part 38, which will be described below.

The first housing part 31 houses the spindle 5. The first housing part 31 has a generally circular hollow cylindrical shape and extends in the up-down direction. The first housing part 31 has an open upper end, which is covered with (by) a cover 311. The cover 311 is fixed to the first housing part 31 with (by) pins. The second housing part 32 houses the motor 41. The second housing part 32 has a generally circular hollow cylindrical shape having a larger diameter than the first housing part 31. The second housing part 32 is disposed behind the first housing part 31. Further, the second housing part 32 is shorter than the first housing part 31 in the up-down direction. A lower end of the second housing part 32 is located above a lower end of the first housing part 31. The connecting part 321 is a plate-like portion that extends from a rear end of the second housing part 32 and projects rearward. The connecting part 321 is disposed between the left shell 303 and the right shell 304, and is fixed to the left shell 303 and the right shell 304 by screws. The third housing part 33 houses the transmitting mechanism 45. The third housing part 33 is disposed behind the first housing part 31 and under the second housing part 32. The third housing part 33 communicates with the first housing part 31 and the second housing part 32. The cover part 35 covers an open upper end of the second housing part 32.

The extending part 36 is a hollow cylindrical part that is connected to a rear end portion (specifically, to the second housing part 32) of the front part 30 and extends rearward. The length of the extending part 36 in the front-rear direction is approximately equal to the length of the central part (grip part) 22 in the front-rear direction. The extending part 36 is thus generally entirely disposed in the central part 22. The extending part 36 has an open rear end. In other words, the rear end of the extending part 36 defines an opening.

The elastic connection part 37 extends rearward from a rear end of the extending part 36 and connects the extending part 36 and the rear part 38 such that the extending part 36 and the rear part 38 are movable relative to each other. The elastic connection part 37 includes a plurality of elastic ribs 371 that connect the extending part 36 and the rear part 38 in the front-rear direction. In this embodiment, four such elastic ribs 371 are arranged spaced apart from each other around a longitudinal axis of the inner housing 3 extending in the front-rear direction. The elastic ribs 371 are shaped to be easily deformable and are also formed of a material having a lower elastic modulus than the other portions of the inner housing 3. The elastic ribs 371 can thus reduce (attenuate) transmission of vibration, which is generated in the front part 30 during operation, to the rear part 38 by elastically absorbing the vibration.

The rear part 38 has a generally rectangular box-like shape. The rear part 38 is disposed within the rear part 23 of the outer housing 2 as described above. A gap is formed between the rear part 23 and an outer peripheral surface of the rear part 38.

The outer housing 2 and the inner housing 3 are elastically connected with each other so as to be movable relative to each other. The structures for elastically connecting the outer housing 2 and the inner housing 3 will be described in detail below.

The structures (elements) disposed within the inner housing 3 are now described in the order of the front part 30, the rear part 38, the elastic connection part 37 and the extending part 36.

Figure 6:
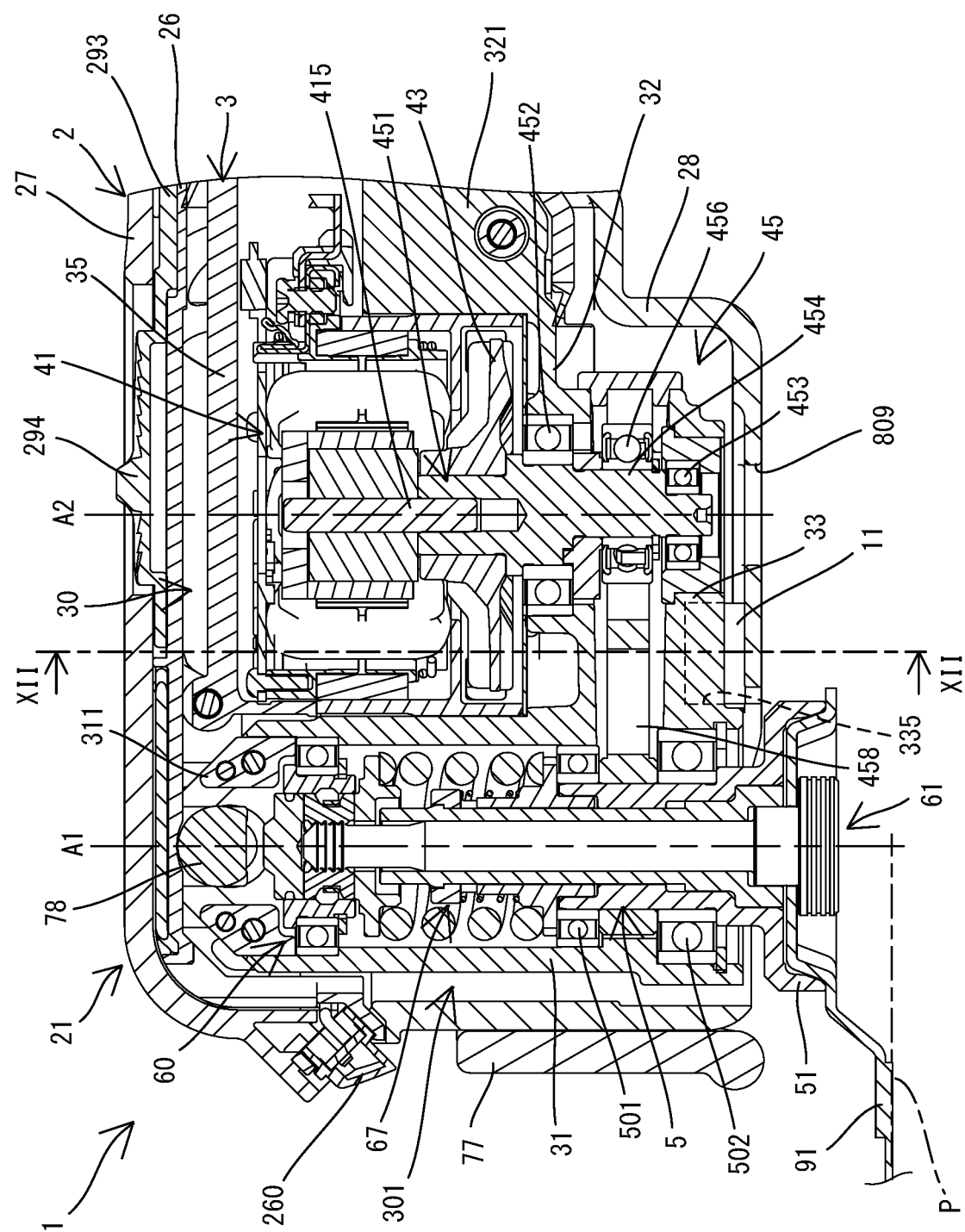
FIG. 6 is a partial, enlarged view of FIG. 2.

First, the structures (elements) disposed within the front part 30 are described. As shown in FIG. 6, the front part 30 houses the spindle 5, the motor 41, the transmitting mechanism 45, a clamping mechanism 60 and a push-down mechanism 67.

Figure 7:
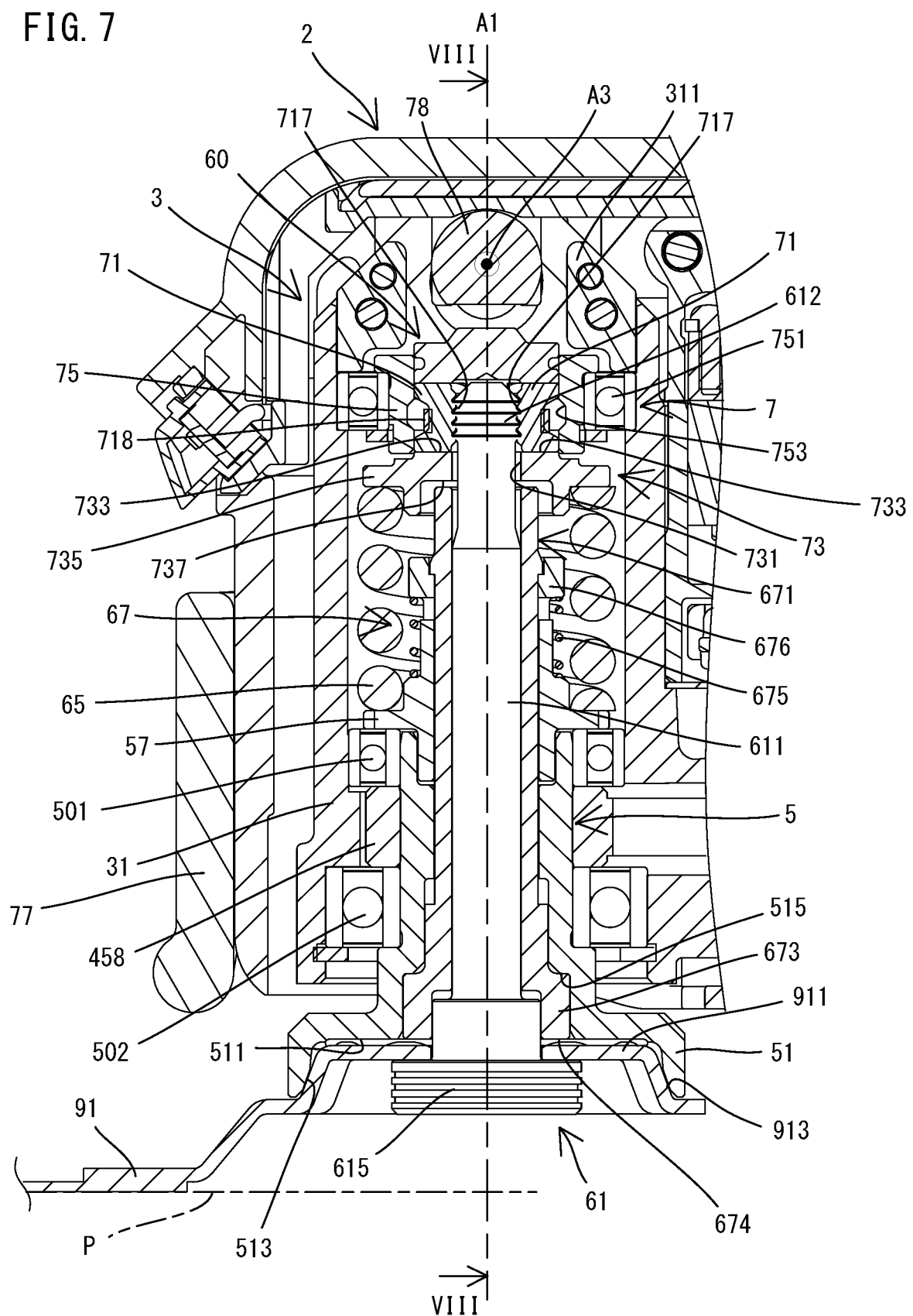
FIG. 7 is a partial, enlarged view of FIG. 6.

The spindle 5 is now described. As shown in FIG. 7, the spindle 5 is an elongate hollow member having a generally circular cylindrical shape. In this embodiment, the spindle 5 is supported by two bearings 501, 502 to be rotatable around the driving axis A1. The bearings 501, 502 are held in a lower portion of the first housing part 31. As described above, the lower end portion of the spindle 5 is configured as the tool mounting part 51, to (on) which the tool accessory 91 is removably mounted.

In this embodiment, the tool mounting part 51 is shaped like a flange protruding radially outward relative to the driving axis A1. The tool mounting part 51 has an inclined surface (oblique surface) 513 that is inclined (oblique) in a direction intersecting the driving axis A1. More specifically, a recess 511, which is indented upwardly, is formed in (on) a lower end portion of the tool mounting part 51. The inclined surface 513 is a portion of a surface that defines the recess 511, and is inclined downward and away from the driving axis A1 (i.e. radially outward). The portion of the tool mounting part 51 having the inclined surface 513 optionally may be formed, e.g., as a truncated cone. All of the tool accessories 91 (such as, e.g., a blade, a scraper, a grinding pad and a polishing pad) that are attachable to the oscillating multi-tool 1 of this embodiment have a protruding part 911 that is configured to be fitted in (mated with) the recess 511. A portion of an upper surface of the tool accessory 91 that defines the protruding part 911 is formed as an inclined surface 913, which conforms to the inclined surface 513. That is, the portion of the tool accessory 91 having the inclined surface 913 may also be formed, e.g., as a truncated cone that is complementary (matching) to the truncated cone of the tool mounting portion 51 so that the two truncated cones can be fit or mated together to form a line contact (circular line contact) between the two mated parts. In this embodiment, the tool accessory 91 is clamped between the tool mounting part 51 and a clamp head (clamping head) 615 of a clamp shaft (clamping shaft) 61, which will be described below, and is thereby secured (fixed) to the spindle 5, in a state in which the inclined surface 913 is in abutment with the inclined surface 513. Fixing the tool accessory 91 to the spindle 5 will be described in detail below. Further, a recess 515 is formed in a central portion of the recess 511. The recess 515 is recessed further upward from the recess 511 and has a circular cross-section.

The motor 41 is now described. The motor 41 is preferably a brushless DC motor. As shown in FIG. 6, the motor 41 has a stator, a rotor disposed within the stator, and an output shaft (rotary shaft) 415 that is configured to rotate together with the rotor. The motor 41 is housed in the second housing part 32 such that a rotational axis A2 of the output shaft 415 extends in parallel, or at least substantially in parallel, to the driving axis A1 (i.e. in the up-down direction). The output shaft 415 protrudes downward from the rotor.

The transmitting mechanism 45 is now described. The transmitting mechanism 45 is configured to convert rotary motion of the output shaft 415 into rotary (pivotal) oscillating motion of the spindle 5 within a specified angle range around the driving axis A1. As shown in FIG. 6, the transmitting mechanism 45 includes an eccentric shaft 451, a drive bearing 456, and an oscillating arm 458.

The eccentric shaft 451 is coaxially connected with the output shaft 415 of the motor 41. The eccentric shaft 451 is fixed to an outer periphery of the output shaft 415. The eccentric shaft 451 extends downward into a lower end portion of the third housing part 33. The eccentric shaft 451 is rotatably supported by two bearings 452, 453, which are respectively held in a lower end portion of the second housing part 32 and in a lower end portion of the third housing part 33. The eccentric shaft 451 has an eccentric part (cam) 454 that is eccentric to the rotational axis A2. An inner ring of the drive bearing 456 is fixed around the eccentric part 454. The oscillating arm 458 operably connects the drive bearing 456 and the spindle 5. The oscillating arm 458 extends across the first housing part 31 and the third housing part 33. Although not shown in detail, because it is a well-known structure, one end portion of the oscillating arm 458 is annular-shaped and fixed around an outer periphery of the spindle 5 between the bearings 501, 502. The other end portion of the oscillating arm 458 is bifurcated (forked) and its two ends are disposed to abut on the left side and the right side, respectively, of an outer peripheral surface of an outer ring of the drive bearing 456.

When the motor 41 is driven, the eccentric shaft 451 rotates together with the output shaft 415. In response to rotation of the eccentric shaft 451, a center of the eccentric part 454 moves (orbits) around the rotational axis A2 and thus the drive bearing 456 also moves eccentrically around the rotation axis A2, which causes the oscillating arm 458 to oscillate within the specified angle range about the driving axis A1 of the spindle 5. The spindle 5 is thus driven with a rotary (pivotal) oscillating motion within the specified angle range around the driving axis A1 in response to oscillating movement of the oscillating arm 458. As a result, the tool accessory 91 mounted to (on) the spindle 5 oscillates about the driving axis A1 in the oscillation plane P, which enables a processing operation to be performed on a workpiece using the oscillating multi-tool accessory 91.

A fan 43 is fixed to an upper end portion of the eccentric shaft 451. The fan 43 of this embodiment is a centrifugal fan. The fan 43 is configured to draw air from above (in the direction of (in parallel to) the rotational axis A2) and feed (push) the air radially outward, while rotating around the rotational axis A2 when the motor 41 is driven. Thus, rotation of the fan 43 generates an air flow for cooling the motor 41 within the housing 10. Airflow paths within the housing 10 will be described in detail below.

Figure 8:
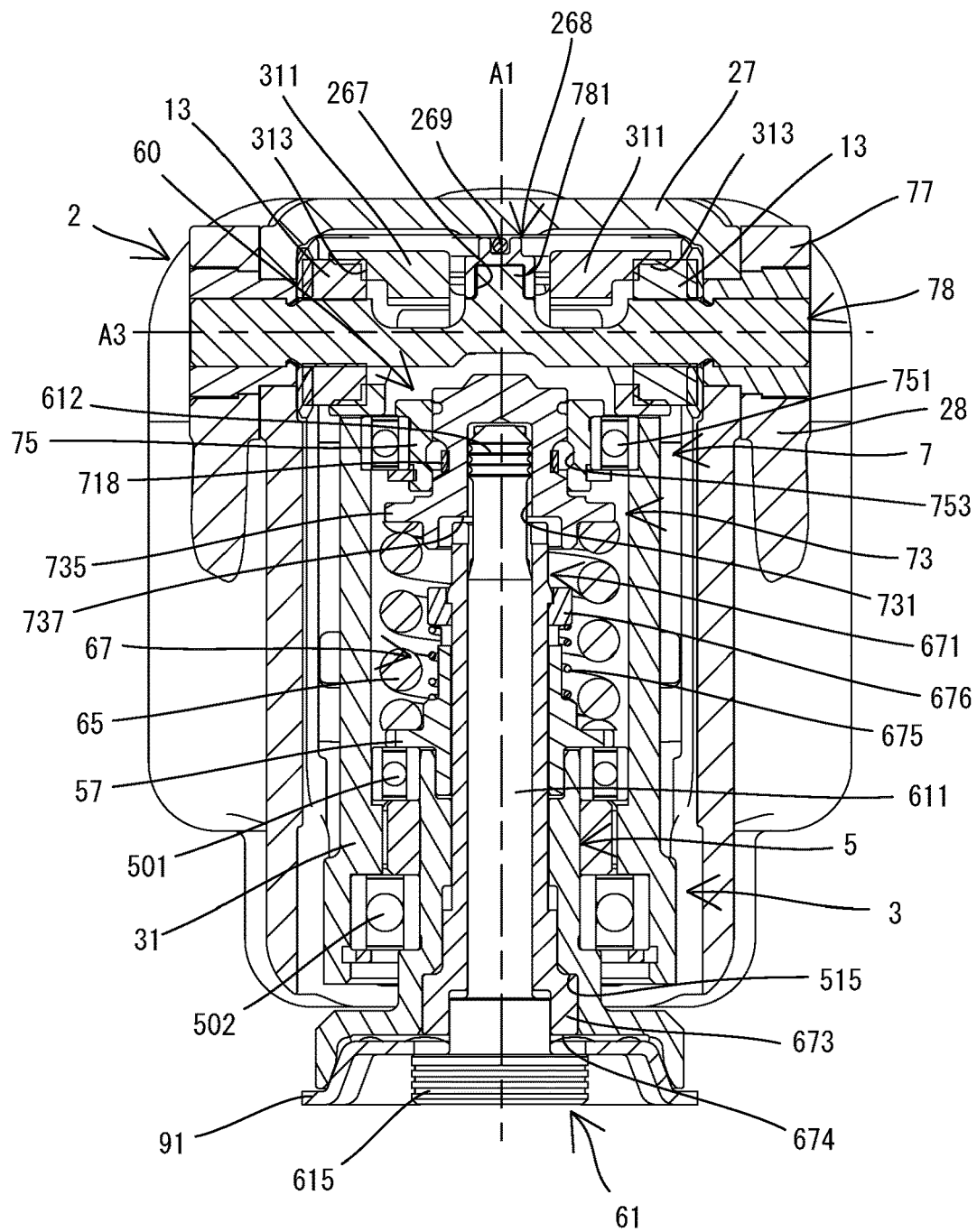
FIG. 8 is a sectional view taken along line VIII-VIII in FIG. 7.

The clamping mechanism 60 is now described. The clamping mechanism 60 is configured to secure (fix) the tool accessory 91 to the tool mounting part 51 such that the tool accessory 91 rotates (pivots back and forth) together with the spindle 5. As shown in FIGS. 7 and 8, in this embodiment, the clamping mechanism 60 includes a clamp shaft (holding bolt) 61, a clamp spring 65 and a lock mechanism (latching mechanism) 7.

The clamp shaft 61 is an elongate member having a generally rod-like shape. The clamp shaft 61 is removably inserted through (into) the spindle 5 to be coaxial with the spindle 5. The clamp shaft 61 has a round rod-like shaft part 611 and a flange-like clamp head 615. The shaft part 611 extends along (coincides with) the driving axis A1. The clamp head 615 is connected to a lower end portion of the shaft part 611. Further, a groove part 612 is formed in (at) an upper end portion of the shaft part 611. The groove part 612 has a plurality of grooves formed around the entire circumference of the clamp shaft 61 and arranged in the up-down direction.

The clamp spring 65 is a biasing member that biases the clamp shaft 61 upward relative to the spindle 5 and thereby applies to the clamp shaft 61 a clamping force for clamping the tool accessory 91. In this embodiment, the clamp spring 65 is configured to bias the clamp shaft 61 upward via the lock mechanism 7 (specifically, a holder 73 and clamp members 71) described below. More specifically, the clamp spring 65 is a compression coil spring. The clamp spring 65 is disposed in a compressed state (i.e. in a loaded state) between a spring receiving member (spring seat) 57 and the holder 73 that will be further described below. The spring receiving member 57 is disposed on an upper end of the spindle 5, such that the spring receiving member 57 rotates together with the spindle 5.

The lock mechanism 7 is configured to hold (lock) the clamp shaft 61 in (at) a clamp position (or clamping position) (shown in FIGS. 7 and 8), in (at) which the clamp shaft and the tool mounting part 51 are capable of clamping the tool accessory 91. The lock mechanism 7 is disposed above the spindle 5 within the first housing part 31. In this embodiment, the lock mechanism 7 includes a pair of clamp members (clamping members or chuck jaws) 71, the holder 73, an elastic ring 718 and a collar 75.

The two clamp members 71 are arranged to face each other across the driving axis A1. A radially inner surface of each clamp member 71 is curved to conform to an outer peripheral surface of the shaft part 611. A ridge part 717 is formed on this curved inner surface of each clamp member 71. The ridge part 717 has a plurality of ridges extending in the circumferential direction and arranged in the up-down direction. The ridges of the ridge parts 717 of the two clamp members 71 are configured to engage (mesh) with the grooves of the groove part 612 of the clamp shaft 61. Upper and lower end portions of each clamp member 71 protrude radially outward, compared to a radially narrower central portion of the clamp member 71. In other words, the central portion of each clamp member 71 in the up-down direction defines a circumferentially-extending groove that extends around the entire circumference of the two clamp members 71.

The holder 73 is configured to hold the clamp members 71 such that the clamp members 71 are movable in the radial direction relative to (i.e. perpendicular to) the driving axis A1, but are not movable in the up-down direction relative to the holder 73. In this embodiment, the holder 73 is formed as a circular cylindrical member having a larger diameter than the shaft part 611 of the clamp shaft 61 as a whole. The holder 73 has an insertion hole 731 and a pair of holding recesses 733.

The insertion hole 731 is a blind hole that extends upward from a lower surface of the holder 73 along the driving axis A1 and has a closed upper end. The insertion hole 731 has a circular cross-section and has a diameter slightly larger than the shaft part 611 of the clamp shaft 61. That is, the inner diameter of the insertion hole 731 is sized to permit the upper end portion of the shaft part 611 to be inserted into the insertion hole 731.

The two holding recesses (slots) 733 are formed in a central portion of the holder 73 in the up-down direction. The holding recesses 733 each extend radially inward (toward the driving axis A1) from the outer peripheral surface of the holder 73. The radially inner edge of each of the holding recesses 733 communicates with the insertion hole 731. Each holding recess 733 has a shape that conforms to one of the clamp members 71. The clamp members 71 are disposed within the holding recesses 733, respectively, so as to be movable in the radial direction relative to the holder 73.

More specifically, each of the clamp members 71 is movable in the radial direction between an engagement position (shown in FIG. 7), which is closer to the driving axis A1, and a disengagement position (shown in FIG. 9), which is farther from the driving axis A1 (i.e. the disengagement position is located radially outward of the engagement position). When the clamp members 71 are in their respective engagement positions, the ridge parts 717 of the clamp members 71 are engaged with the respective grooves of the groove part 612 of the clamp shaft 61. Further, when the clamp members 71 are in their engagement positions, outer peripheral surfaces of the clamp members 71 are each arranged substantially flush with an outer peripheral surface of the holder 73 so as not to protrude radially outward from the holding recesses 733. On the other hand, when the clamp members 71 are in their respective disengagement positions, the ridge parts 717 are not engaged or engageable with the groove part 612. Further, when the clamp members 71 are in their respective disengagement positions, the outer peripheral surfaces of the clamp members 71 each slightly protrude radially outward from the holding recess 733, i.e. radially outward of the outer peripheral surface of the holder 73.

Further, the lower end portion of the holder 73 has a flange-like spring receiving part (spring seat or spring abutment surface) 735 that protrudes radially outward. A lower surface of the spring receiving part 735 is in abutment with an upper end portion of the clamp spring 65. Further, a lower surface of a lower end central portion (an annular part surrounding the insertion hole 731) of the holder 73 serves as an abutment part 737, which abuts on a push-down sleeve (pusher) 671 when an unclamping operation is performed, which will be described in detail below.

The elastic ring 718 is fitted in the grooves that are respectively formed in the central portions of the outer peripheral surfaces of the clamp members 71. The elastic ring 718 biases the clamp members 71 radially inward toward their respective engagement positions. The elastic ring 718 of this embodiment is an annular member formed of rubber or another elastomer.

The collar 75 is a hollow circular cylindrical member. The collar 75 holds (surrounds) the holder 73 and the clamp members 71 such that the holder 73 and the clamp members 71 are linearly movable relative to the collar 75 along the driving axis A1 (i.e. in the up-down direction). The holder 73 is disposed inside the collar 75 to be slidable in the up-down direction along an inner peripheral surface of the collar 75. The collar 75 is supported to be immovable in the up-down direction relative to the inner housing 3, and to be rotatable around the driving axis A1. More specifically, the collar 75 is rotatably supported by a bearing 751 that is disposed around the collar 75 and held within an upper end portion of the first housing part 31. Because the collar 75 is disposed above the spindle 5 in the first housing part 31, rather than within the spindle 5, assembly of the collar 75 is facilitated. The collar 75 may be designed, e.g., as a linear slide bearing or sleeve bushing that supports linear movement of the holder 73 while permitting both linear and radial movement of the clamp members 71.

More specifically, in this embodiment, the collar 75 is configured to selectively prevent (block) and allow radial movement of the clamp members 71 from the engagement positions to the disengagement positions, depending on the position of the collar 75 relative to the clamp members 71 in the up-down direction. In other words, each of the clamp members 71 is movable in the up-down direction relative to the collar 75 between a position (hereinafter referred to as a lock position) in which the clamp member 71 is not allowed to move from the engagement position and a position (hereinafter referred to as an unlock position) in which the clamp member 71 is allowed to move in the radial direction from the engagement position to the disengagement position.

Figure 9:
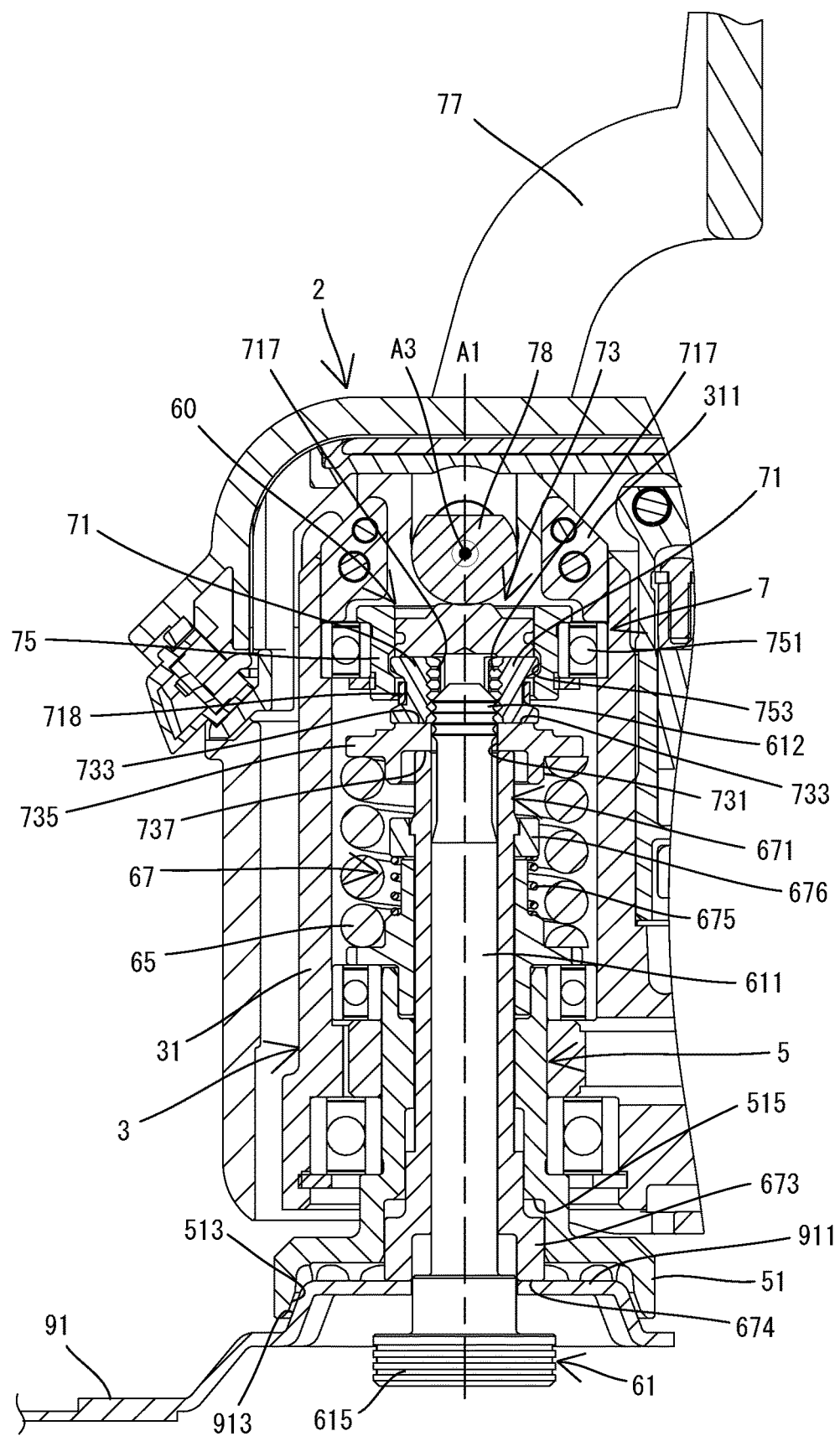
FIG. 9 is a sectional view corresponding to FIG. 7, wherein the lever is in an upper position.

More specifically, the collar 75 has approximately the same inner diameter as the outer diameter of the upper portion of the holder 73. An annular groove 753 is formed in a central portion of the collar 75 in the up-down direction. The annular groove 753 is recessed radially outward from the inner peripheral surface of the collar 75. Therefore, as shown in FIG. 7, at a position where the outer peripheral surfaces of the two clamp members 71 (more specifically, the outer peripheral surfaces of the upper and lower end portions thereof) abut on the smaller inner diameter portion of the inner peripheral surface of the collar 75 (other than the groove 753, which is a larger inner diameter portion of the inner peripheral surface of the collar 75), the clamp members 71 are blocked from moving radially outward from the engagement position. Thus, the clamp members 71 are located and maintained (held) in the lock position (engagement position). On the other hand, as shown in FIG. 9, at a position where the upper end portions of the clamp members 71 face (oppose) the groove 753 and the lower end portion of the collar 75 faces (oppose) the groove formed in the outer peripheral portions of the clamp members 71 (and thus oppose the elastic ring 718), the clamp members 71 are movable (are not blocked from moving) radially outward from the engagement position to the disengagement position. Thus, the clamp members 71 are located in the unlock position. In this embodiment, the clamp members 71 are held by the holder 73 as described above. Therefore, the clamp members 71 are movable in the up-down direction and in the radial direction relative to the collar 75 in a stable manner.

The positional relation between the clamp members 71 and the collar 75 in the up-down direction changes in response to manual operation (turning) of the lever 77, which will be described in detail below.

The push-down mechanism 67 is now described. The push-down mechanism 67 is configured to push down the tool accessory 91 relative to the spindle 5 in response to operation of the clamping mechanism 60 (specifically, in response to downward movement of the holder 73). As shown in FIGS. 7 and 8, in this embodiment, the push-down mechanism 67 includes a push-down sleeve (pusher) 671 that is movable in the up-down direction relative to the spindle 5, and a biasing spring 675 that biases the push-down sleeve 671 upward relative to the spindle 5.

The push-down sleeve 671 is inserted through (into) the spindle 5 to be coaxial with the spindle 5. Further, the push-down sleeve 671 is configured to allow the clamp shaft 61 to be inserted therethrough. Thus, the push-down sleeve 671 is disposed between the spindle 5 and the clamp shaft 61 in the radial direction.

More specifically, in the present embodiment, the push-down sleeve 671 is an elongate hollow circular cylindrical member (shaft). The push-down sleeve 671 has an outer diameter that is approximately equal to the inner diameter of the spindle 5 and an inner diameter that is approximately equal to the diameter of the shaft part 611. The push-down sleeve 671 is longer than the spindle 5, and an upper end portion of the push-down sleeve 671 protrudes upward from the spindle 5. The clamp shaft 61 is longer than the push-down sleeve 671. When the clamp shaft 61 is inserted through the push-down sleeve 671, the clamp head 615 and the groove part 612 respectively protrude from the lower end and the upper end of the push-down sleeve 671. A lower end portion of the push-down sleeve 671 forms a large-diameter part 673 having a larger diameter than other portions of the push-down sleeve 671. The large-diameter part 673 is configured to be fitted in the recess 515 formed in the lower end portion of the spindle 5. The large-diameter part 673 has an annular flat lower end surface 674.

Although the push-down sleeve (pusher) 671 is a hollow circular cylindrical shaft in the present embodiment, it may be modified in various ways while still performing the function of pushing down the tool accessory 91 relative to the spindle 5 (thereby breaking any adhesion between the tool accessory 91 and the tool mounting portion 51) in response to an unclamping operation performed by the lever 77. For example, the push-down sleeve (pusher) 671 may instead be designed as one or more elongate bars having a first longitudinal end configured to contact (directly or indirectly) and press the tool accessary 91 and a second longitudinal end configured to receive a downward pressing force generated when the lever 77 pivots from the clamped position to the unclamped position. The lever 77 may directly contact the second longitudinal end of such a pusher (elongate bar) or the force generated by the lever 77 may be indirectly communicated to the second longitudinal end of such a pusher, e.g., via the holder 73 or another intermediate structure (member). Such a pusher may include a flange or other type of spring seat that is pressed upwardly by the biasing spring 675 or by the clamp spring 65. One or more longitudinally (vertically) extending grooves may be defined in the inner surface of the spindle 5 and/or in the outer surface of the clamp shaft 61 to receive the elongate bar(s) and support linear sliding movement of the pusher relative to both the spindle 5 and the clamp shaft 61. The first longitudinal end of such a pusher may have a larger cross-section in the up-down direction and portions of the pusher upward of the first longitudinal end so that a larger surface of the pusher contacts and presses against the tool accessory 91.

The biasing spring 675 is a compression coil spring having a smaller diameter than the clamp spring 65. The biasing spring 675 is disposed inside the clamp spring 65. A lower end portion of the biasing spring 675 is in abutment with the spring receiving member 57. Thus, the spring receiving member 57 serves as common spring receiving part (spring seat) for both the clamp spring 65 and the biasing spring 675. As a result, a compact arrangement of the clamp spring 65 and the biasing spring 675 is realized, while preventing an increase of the number of components (part count).

Further, an upper end portion of the biasing spring 675 is in abutment with a spring receiving member (spring seat or spring stop) 676. The spring receiving member 676 is disposed above the spring receiving member 57. The spring receiving member 676 is fitted around the push-down sleeve 671 so as to be movable in the up-down direction relative to the spring receiving member 57. An upper end portion of the spring receiving member 676 is held in abutment from below with a projection formed on an outer periphery of the push-down sleeve 671. Such a structure enables the biasing spring 675 to bias the push-down sleeve 671 upward via the spring receiving member 676.

The push-down sleeve 671 is normally held in (at) an uppermost position, in (at) which a shoulder part (stepped part) of the large-diameter part 673 abuts on a shoulder part (stepped part) of the recess 515 of the spindle 5. When the push-down sleeve 671 is located in (at) the uppermost position, the lower end (the lower end surface 674) of the push-down sleeve 671 is located above the tool accessory 91 (more specifically, above the upper surface of the protruding part 911) clamped between the tool mounting part 51 and the clamp head 615. Further, an upper end of the push-down sleeve 671 is located below the lower surface (the abutment part 737) of the holder 73.

The above-described clamping mechanism 60 and push-down mechanism 67 are configured to operate in response to the lever 77 being manually pivoted (turned, opened) by a user. More specifically, the positional relation of the clamp members 71 and the holder 73 with the collar 75 in the up-down direction changes in response to the manual pivoting of the lever 77. In addition, the push-down mechanism 67 also moves in response to movement of the holder 73. The pivoting operation of the lever 77 and the resulting operation (movements) of the clamping mechanism 60 and the push-down mechanism 67 are now described.

Figure 10:
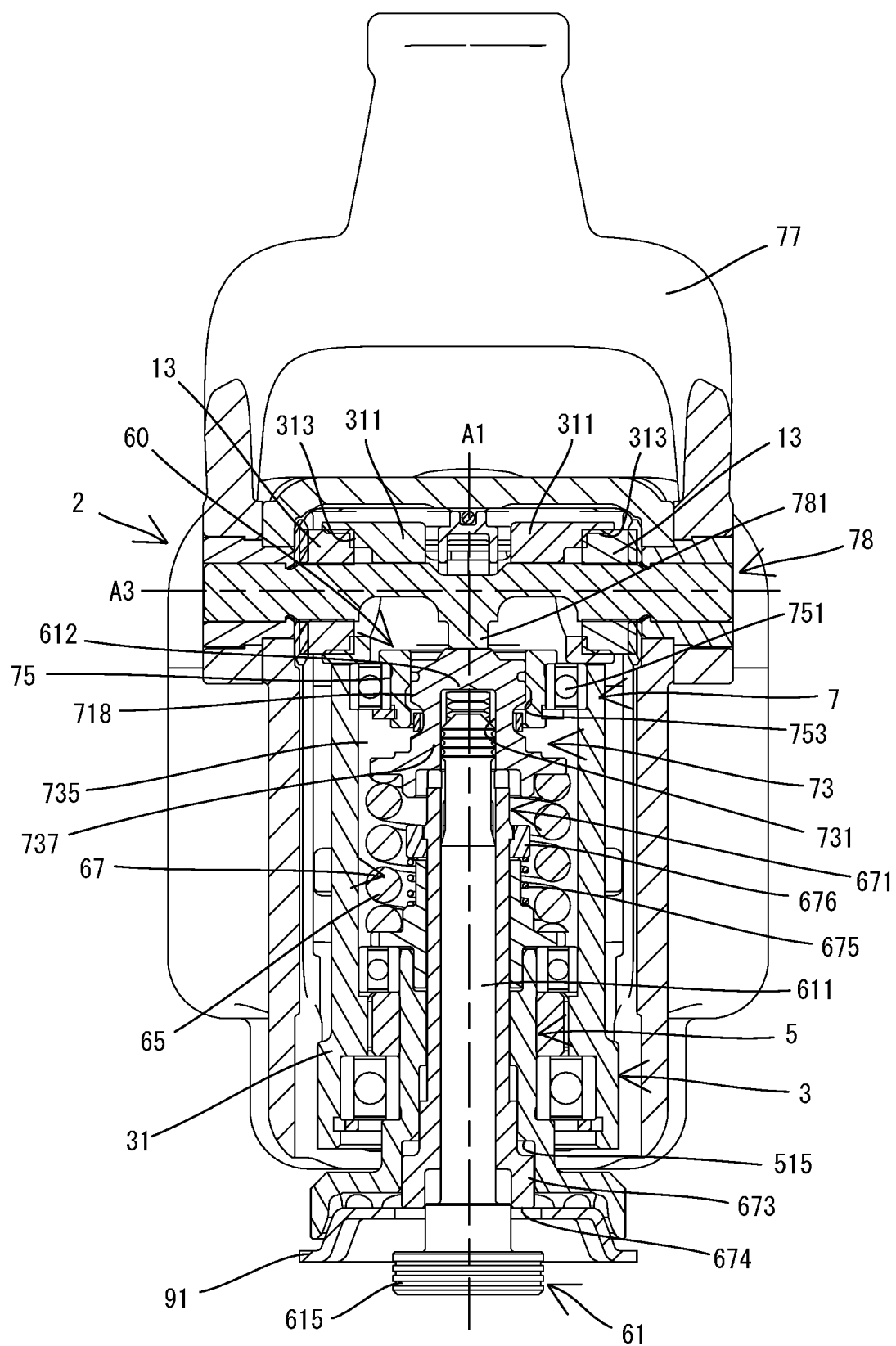
FIG. 10 is a sectional view corresponding to FIG. 8, wherein the lever is in the upper position.

First, the lever 77 is described. As shown in FIGS. 1 and 8 (see also FIGS. 10 and 13), an upper end of the lever 77 is generally U-shaped, and both upper end portions of the lever 77 are rotatably supported by (at) an upper portion of the front part 21 of the outer housing 2. The lever 77 is manually pivotable (rotatable) between a first position (hereinafter referred to as a front position or clamping position), in (at) which a central portion of the lever 77 abuts on a front surface of the front part 21 as shown in FIGS. 1 and 7, and a second position (hereinafter referred to as an upper position or unclamped position), in (at) which the central portion of the lever 77 is located above the front part 21 as shown in FIGS. 9 and 10. The lever 77 is fixedly connected to a rotary shaft (pin) 78 so that the lever 77 and the rotary shaft 78 rotate (pivot) together around a rotational axis A3, which extends in the left-right direction and is located above the lock mechanism 7 (the holder 73). The rotary shaft 78 is inserted through a through hole that extends through the cover 311 of the front part 30 of the inner housing 3 in the left-right direction. The two end portions of the rotary shaft 78 are respectively connected to the two upper end portions of the lever 77 and are rotatably supported by the outer housing 2. Therefore, the rotary shaft 78 rotates together with the lever 77 in response to manual pivoting (rotation) of the lever 77. An eccentric part (cam part or turn block) 781, which is eccentric to the rotational axis A3, is provided on a central portion of the rotary shaft 78 such that the driving axis A1 intersects the eccentric part 781.

When the lever 77 is in (at) the front position, as shown in FIGS. 7 and 8, a first portion of the eccentric part 781 that has a smaller diameter (a small-diameter part) is located spaced apart upward from the holder 73. Therefore, the rotary shaft 78 is not subjected to the biasing force of the clamp spring 65. At this time, the clamp members 71 are in their respective lock positions relative to the collar 75, and also in their respective engagement positions and holding the clamp shaft 61. The holder 73, the clamp members 71 and the clamp shaft 61 are biased upward together, and thus the clamp shaft 61 is held in the (at its) uppermost position. Consequently, the biasing force of the clamp spring 65 causes the clamp head 615 to press the tool accessory 91 against the tool mounting part 51 from below and thereby secure the tool accessory 91 to (on) the spindle 5. Thus, in this state, the clamp head 615 clamps the tool accessory 91 in cooperation with the tool mounting part 51. Accordingly, the uppermost position of the clamp shaft 61 is also referred to as a clamp position or clamping position.

In the process of pivoting the lever 77 upward from the front position and placing it in (at) the upper position shown in FIGS. 9 and 10, a second portion of the eccentric part 781 that has a larger diameter (large-diameter part) comes into contact with an upper end of the holder 73 from above and thereby causes the holder 73 to move downward relative to the spindle 5 and the collar 75 while compressing the clamp spring 65. As a result, the clamping force (the force that presses the tool accessory 91 upward against the spindle 5), which is imparted to the clamp head 615 by the clamp spring 65, is released. Accordingly, the act of pivoting the lever 77 from the front position to the upper position is also referred to as unclamping operation.

In response to the unclamping operation, the clamp members 71 held by the holder 73 are moved downward relative to the collar 75 and are placed in their unlock positions. Thus, the lock mechanism 7 releases (disables) the locking of the clamp shaft 61. However, as described above, the two clamp members 71 are still biased toward their engagement positions by the elastic ring 718 fitted in the respective grooves formed on the outer peripheral surfaces of the clamp members 71. Therefore, the clamp shaft 61 is temporarily held in (at) this position by the clamp members 71 and does not disconnect from the spindle 5 unless and until an external force is applied to force the clamp members 71 to move (slide) radially outward from their engagement positions against the biasing force of the elastic ring 718. For example, in this state, if the user manually pulls the clamp shaft 61 downward relative to the spindle 5, then the clamp members 71 will be caused to move to their disengagement positions owing to this externally applied manual force. Therefore, the user can manually pull the clamp shaft 61 out of the spindle 5 to replace the tool accessory 91 while the lever 77 is in (at) its unclamped position.

Further, while the holder 73 is moving downward relative to the spindle 5 in response to the unclamping operation, the abutment part 737 of the holder 73 abuts (from above) on the upper end of the push-down sleeve 671 (which is located in (at) the (its) uppermost position), and then pushes down the push-down sleeve 671 against the biasing force of the biasing spring 675. Thus, the holder 73 performs the function of pushing down the push-down sleeve 671, in addition to the function of holding the clamp members 71. While the tool accessory 91 is pressed against the tool mounting part 51 from below by the clamp head 615 with the inclined surface 913 in abutment with the inclined surface 513 (see FIG. 7) and the tool accessory 91 is oscillated in this state, it is possible that the clamping pressure will cause the tool accessory 91 to stick (adhere) to the tool mounting part 51 of the spindle 5. However, when the push-down sleeve 671 is moved (pushed) downward relative to the tool mounting part 51, the large-diameter part 673 of the push-down sleeve 671 abuts on the tool accessory 91 from above and pushes down the tool accessory 91 relative to the tool mounting part 51, thereby separating the tool accessory 91 from the tool mounting part 51 and eliminating (breaking) any sticking (adhesion) of the tool accessory 91 to the tool mounting part 51. In this embodiment, the lower end surface (annular flat surface) 674 of the push-down sleeve 671 comes into plane contact (surface contact), e.g., annular contact, with the upper surface of the tool accessory 91 around the shaft part 611 and pushes down the tool accessory 91 in an evenly-balanced manner, so that the sticking of the tool accessory 91, if any, can be reliably broken.

The operation for mounting the clamp shaft 61 to (in) the spindle 5 and clamping the tool accessory 91 is basically the reverse of the operation for removing the tool accessory 91. That is, when the lever 77 is in the (at its) upper position and the clamp members 71 are in the unlock positions relative to the collar 75, the user inserts the clamp shaft 61, with the tool accessory 91 fitted thereon, into the spindle 5 (more specifically, into the push-down sleeve 671). The user then upwardly moves the clamp shaft 61 to a position where an upper end of the clamp shaft 61 abuts on the holder 73. In this process, the clamp members 71 are first respectively moved to the disengagement positions and then are returned to their engagement positions owing to the biasing force of the elastic ring 718. The ridge parts 717 thereby engage with the groove part 612 such that the clamp shaft 61 is temporarily held by the clamp members 71 owing to the radial-inward biasing force of the elastic ring 718.

When the user then pivots (rotates) the lever 77 from the upper position to the front position, the downward force that was previously applied to the clamp spring 65 by the larger-diameter portion of the eccentric part 781 (via the holder 73) in the unclamped position is released. As a result, the clamp spring 65 biases (moves) the holder 73 and the clamp members 71 upward relative to the collar 75. When the clamp members 71 are moved to their lock positions relative to the collar 75, the clamp shaft 61 also returns to the (its) clamped position.

Figure 4:
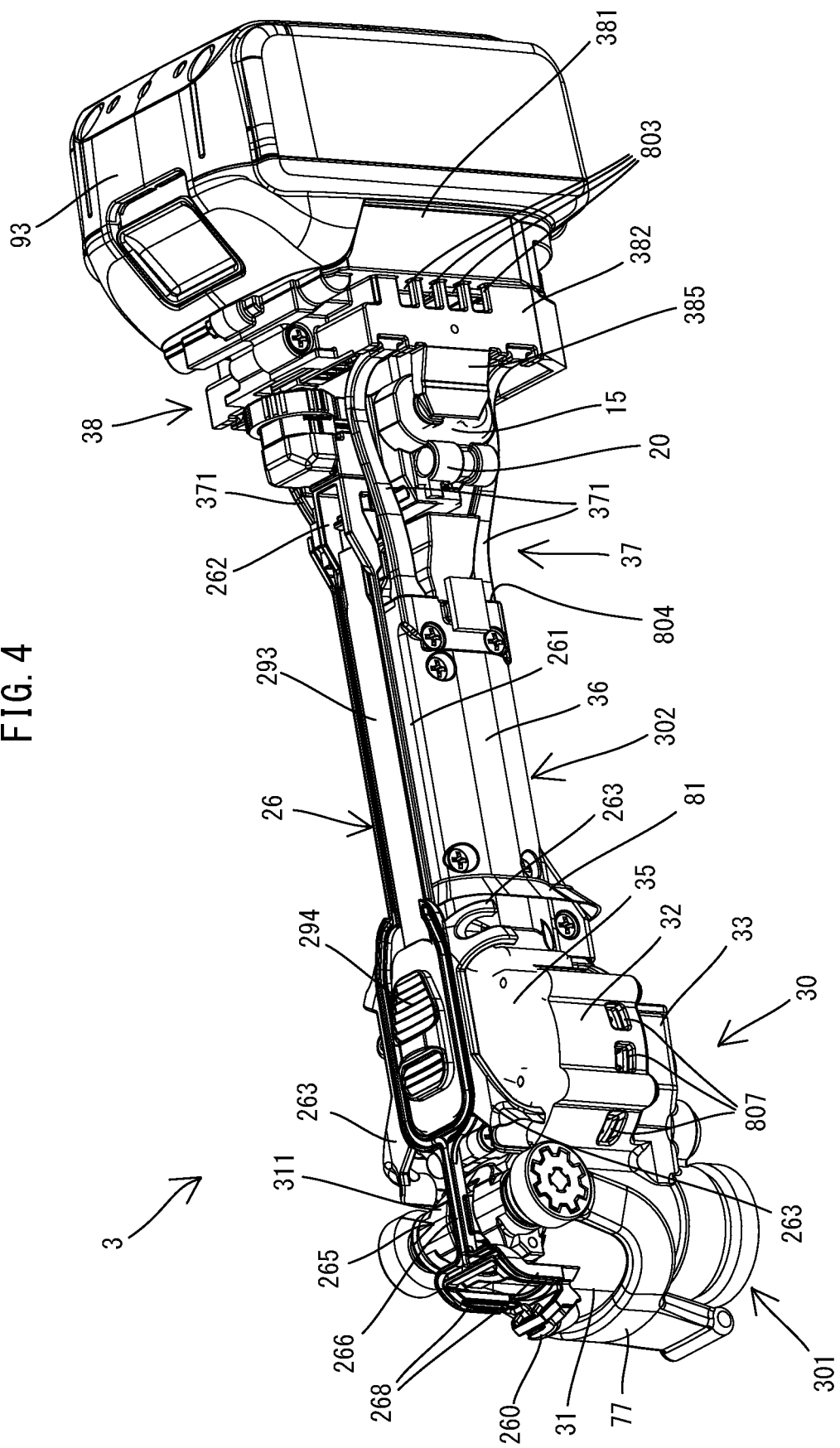
FIG. 4 is a perspective view of an inner housing as viewed from above.

The structures (elements) disposed within the rear part 38 are now described. As shown in FIGS. 2 to 4, in this embodiment, a rear portion of the rear part 38 is configured as a battery mounting part 381. The battery mounting part 381 has an engagement structure for sliding engagement with the battery (battery pack, battery cartridge) 93, and terminals that are electrically connectable to corresponding terminals of the battery 93. The structures of the battery mounting part 381 are well known and therefore not described in detail here. A front portion of the rear part 38 is configured as a controller housing part 382. The controller housing part 382 houses a controller 383 that includes a control circuit, e.g., a circuit board having a microprocessor, memory, etc. mounted thereon. The controller 383 is configured to drive (energize) the motor 41 when the switch 29 is turned ON.

The structures (elements) disposed within the elastic connection part 37 are now described. As shown in FIGS. 2 to 4, the switch holder 20 is disposed in an internal space (a space surrounded by the elastic ribs 371 in the circumferential direction) of the elastic connection part 37. The switch holder 20 is configured to hold the switch 29. Although the switch holder 20 is disposed in the internal space of the elastic connection part 37, the switch holder 20 is fixed to the upper shell 27 and the lower shell 28 by screws, and forms part of the outer housing 2.

The structures (elements) disposed within the extending part 36 are now described. As shown in FIGS. 2 to 4, in this embodiment, the spindle 5, the motor 41 and the transmitting mechanism 45 are disposed in the front part 30, and the battery mounting part 381 is disposed in or on the rear part 38. Such an arrangement enables the number of components to be disposed in the extending part 36 to be reduced or minimized. Although not shown, only wires, which connect the controller 383 with a circuit board attached to the motor 41, and a connecting terminal are disposed in the extending part 36, and no other components need be disposed therein. Thus, the extending part 36 is formed narrower (i.e. the extending part 36 has a smaller diameter or section) than the front part 30, the elastic connection part 37 and the rear part 38, in order to provide an easy-to-hold dimension (periphery) for the central part (i.e. grip part) 22.

Structures for elastically connecting the outer housing 2 and the inner housing 3 are now described. In this embodiment, the outer housing 2 and the inner housing 3 are elastically connected to each other at multiple positions. Specifically, elastic members are disposed between the front part 21 of the outer housing 2 and the front part 30 of the inner housing 3, between the rotary shaft 78 supported by the outer housing 2 and the front part 30, and between the switch holder 20 and the rear part 38.

First, structures for elastically connecting the front part 21 of the outer housing 2 and the front part 30 or the inner housing 3 are described.

Figure 11:
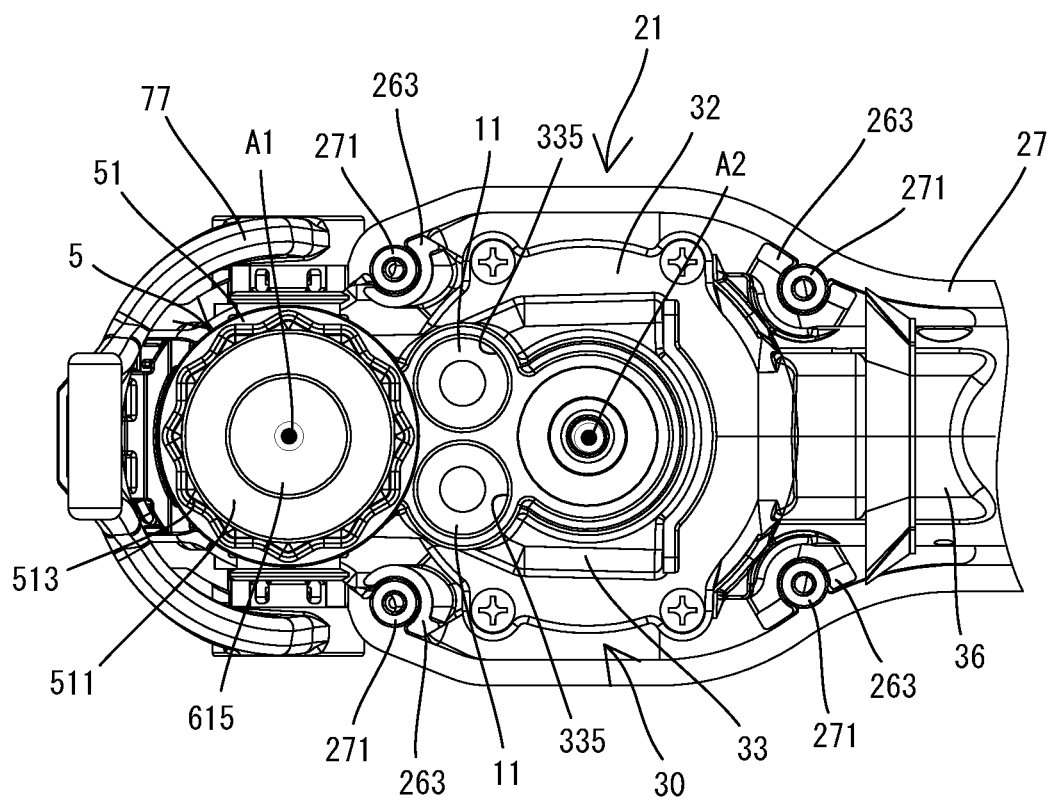
FIG. 11 is a bottom view of the oscillating multi-tool, wherein a lower shell has been removed therefrom.
Figure 12:
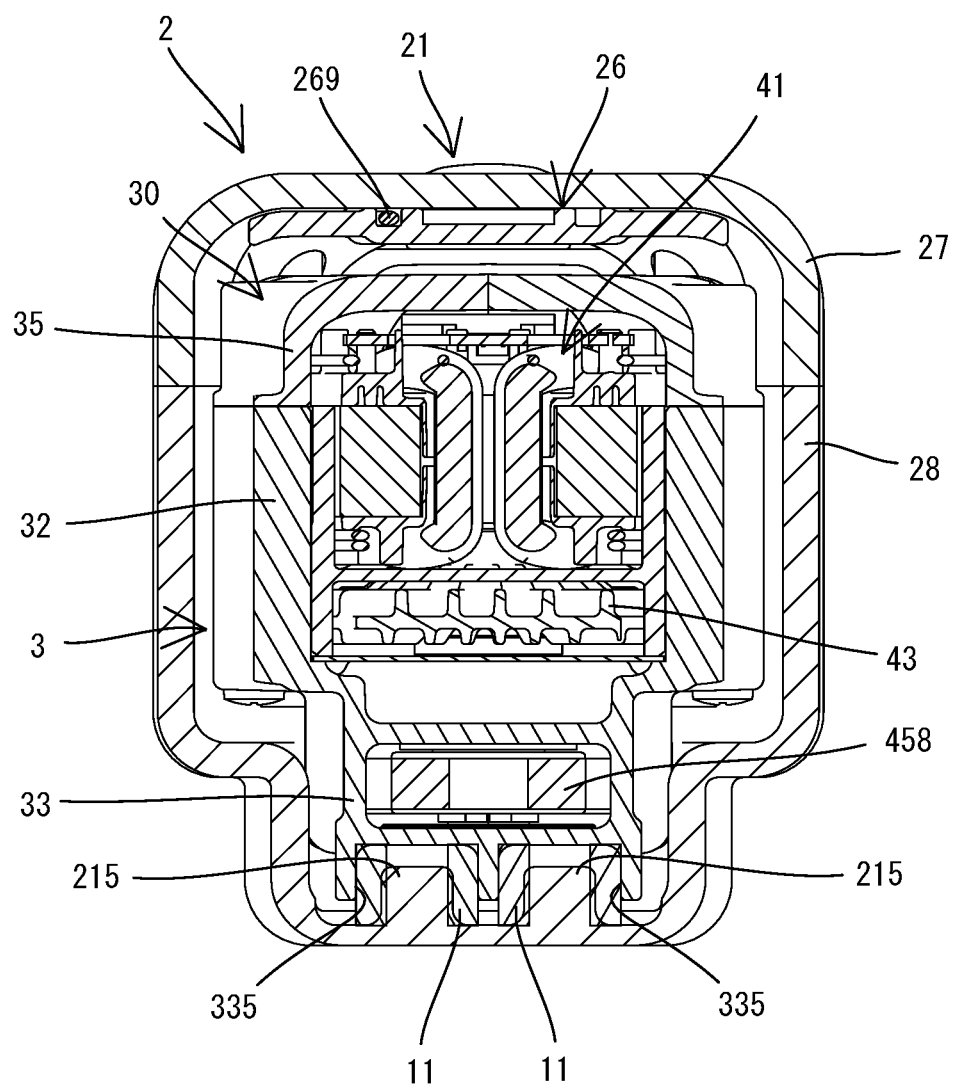
FIG. 12 is a sectional view taken along line XII-XII in FIG. 6.

As shown in FIGS. 5, 6, 11 and 12, two recesses 335 each have a circular section and are formed in a lower wall of the front part 30. More specifically, the recesses 335 are formed in a lower wall of the third housing part 33 that houses the oscillating arm 458 of the transmitting mechanism 45. The recesses 335 are recessed upward from a lower surface of the lower wall. The two recesses 335 are arranged side by side in the left-right direction. Further, in the front-rear direction, the recesses 335 are located between the driving axis A1 of the spindle 5 and the rotational axis A2 of the output shaft 415 of the motor 41 (more specifically, between the bearing 502 and the bearing 453). As shown in FIG. 12, two cylindrical projections 215 are formed on a lower wall of the front part 21. The projections 215 protrude upward from the lower wall of the front part 21. The projections 215 respectively face (oppose) central portions of the recesses 335 of the inner housing 3.

An elastic member 11 is fitted in each of the recesses 335. Each elastic member 11 has a hollow circular cylindrical (annular) shape. Each of the projections 215 is fitted inside the corresponding elastic member 11 such that the elastic members 11 respectively surround the entire circumference of the projection 215. The height of each of the elastic members 11 is set to be larger than the depth of the recesses 335 and the height of the projections 215, so that clearances are provided between the inner housing 3 and the outer housing 2 in the up-down direction. In this manner, each hollow cylindrical elastic member 11 is disposed between the inner housing 3 and the outer housing 2 with its outer peripheral surface and upper end surface in contact with the inner housing 3 and its inner peripheral surface and lower end surface in contact with the outer housing 2. In this embodiment, the elastic members 11 are each formed of urethane-based resin (polymer) having a microfoam structure (also referred to as a microcellular structure).

Structures for elastically connecting the rotary shaft 78 and the front part 30 are now described.

As shown in FIG. 8, left and right end portions of the rotary shaft 78 are rotatably supported by left and right upper end portions of the front part 21, respectively. The rotary shaft 78 extends through the cover 311 of the front part 30 in the left-right direction within an upper end portion of the front part 21. Recesses 313 are formed in left and right walls of the cover 311, respectively. The recesses 313 are recessed inward (toward the center in the left-right direction) and each have a circular cross-section. Two hollow circular cylindrical (annular) elastic members 13 are fitted around the rotary shaft 78. The two elastic members 13 are respectively arranged inside of left and right walls of the front part 21. The elastic members 13 are respectively fitted in the recesses 313 with the outside portions thereof exposed from the recesses 313. The outside portion of each of the elastic members 13 is pressed against the outer housing 2 via a respective washer. Thus, an outer peripheral surface and an inside end surface of each of the elastic members 13 are in contact with the inner housing 3. An inner peripheral surface of each of the elastic members 13 is in contact with the rotary shaft 78 connected to the outer housing 2. Further, an outside end surface of each of the elastic members 13 is in contact with the outer housing 2 via the respective washers. In such a contact condition, the elastic members 13 are disposed between the inner housing 3 and the outer housing 2. Like the elastic members 11, the elastic members 13 are also formed of urethane-based resin (polymer) having a microfoam structure.

Structures for elastically connecting the switch holder 20 and the rear part 38 are now described.

As shown in FIG. 3, the switch holder 20 has a generally rectangular box-like shape. Recesses 203 are respectively formed in left and right walls of the switch holder 20. The recesses 203 are each recessed inward (toward the center in the left-right direction). Elastic members 15 are respectively fitted in the recesses 203. Like the elastic members 11 and 13, the elastic members 15 are also formed of urethane-based resin (polymer) having a microfoam structure. A though hole extends through each of the elastic members 15 in the left-right direction such that the elastic members 15 have a hollow cylindrical (annular) shape. An arm part 385 protrudes forward from each of the left and right walls of the rear part 38 (the controller housing part 382) of the inner housing 3. A projection 386 is formed on (at) a tip end portion of each arm part 385 and protrudes inward (toward the center in the left-right direction). A tip end portion of each arm part 385 is in contact with an outside surface of the corresponding elastic member 15, and the projections 386 are respectively fitted in the through holes of the elastic members 15. The elastic members 15 respectively surround the entire circumference of each of the projections 386. A tip end of the projection 386 is spaced apart from a bottom of the recess 203.

Owing to the above-described structures, the inner housing 3 and the outer housing 2 are movable relative to each other in all directions, including the up-down, front-rear and left-right directions, via the elastic members 11, 13, 15. Thus, the inner housing 3 and the outer housing 2 are elastically connected to each other so as to be capable of coping with (absorbing, attenuating) vibrations generated in any direction.

The largest vibration is generated in the front part 30 of the inner housing 3 during the oscillatory driving of the tool accessory 91 because the front part 30 houses the motor 41, the spindle 5 and the transmitting mechanism 45. More specifically, the output shaft 415 and the spindle 5 generate vibration when they are rotationally driven. To cope with this vibration, in this embodiment, the elastic members 11 elastically connect the inner housing 3 and the outer housing 2 and are disposed between the driving axis A1 of the spindle 5 and the rotation axis A2 of the output shaft 415 in the front-rear direction. Owing to such an arrangement, the elastic members 11 can cope with (absorb, attenuate) both the vibration originating at the spindle 5 and the vibration originating at the output shaft 415 and thus can effectively reduce transmission of vibration to the outer housing 2. Further, in the up-down direction, the elastic members 11 are disposed under the third housing part 33, which houses the oscillating arm 458 of the transmitting mechanism 45, and thus in (at) a position relatively close to the oscillation plane P. This arrangement can reduce wobbling or rattling of the inner housing 3 within the outer housing 2 during the oscillatory driving of the tool accessory 91.

In this embodiment, because the two elastic members 11 are arranged side by side in the left-right direction, the elastic connection has a higher durability than in an embodiment in which only one elastic member 11 is employed.

Further, in this embodiment, the front part 30 of the inner housing 3 is elastically connected to the outer housing 2 via the elastic members 13 fitted onto the rotary shaft 78, as well as via the elastic members 11. In addition to the front part 30, the rear part 38 of the inner housing 3 is elastically connected to the switch holder 20, which is part of the outer housing 2, via the elastic members 15. Therefore, transmission of vibration to the outer housing 2 can be further effectively reduced.

Further, owing to the above-described arrangement of the elastic members 13, the rotary shaft 78 can be stably held by the inner housing 3 (the cover 311) via the elastic members 13 before the rotary shaft 78 is assembled in the outer housing 2. Thereafter, both of the end portions of the rotary shaft 78 are held between the upper shell 27 and the lower shell 28 of the outer housing 2, and the upper shell 27 and the lower shell 28 are connected together by screws, so that the rotary shaft 78 is held by the outer housing 2. In this manner, the elastic members 13 also help facilitate assembly. Further, the rotary shaft 78 is held in a well-balanced (evenly-balanced) manner by the two elastic members 13 that are respectively disposed around the left and right end portions of the rotary shaft 78. Furthermore, the cylindrical elastic members 13 can be easily assembled (mounted) by simply fitting them around the rotary shaft 78.

As described above, the switch 29 for starting the motor 41 is held by the rear part 23 of the outer housing 2 via the switch holder 20. Thus, a switching member (switch lever) 293 is connected to an actuation part 291 of the switch 29 for switching ON and OFF the switch 29 and is also held by the outer housing 2. The switching member 293 and structures for holding the switching member 293 are now described.

As shown in FIGS. 2 and 4, the switching member (slide switch) 293 is an elongate member linearly extending in the front-rear direction. The operation part (tab, knob) 294 is integrally formed on a front end portion of the switching member 293. A rear end portion of the switching member 293 is operably connected to the actuation part (e.g., a lever or arm) 291 of the switch 29, which optionally may be a slide switch or a toggle switch. The switching member 293 is configured to move (slide, pivot) the actuation part 291 between an ON position and an OFF position (i.e. configured to switch ON and OFF the switch 29) by moving in the front-rear direction in response to the user manually sliding the operation part 294 in the front-rear direction. In this embodiment, the switching member 293 is held by a holding member 26, which is supported by the outer housing 2, so as to be movable (slidable) in the front-rear direction relative to the outer housing 2.

As shown in FIGS. 2, 4, 13 and 14, the holding member 26 is supported by the lower shell 28 and the switch holder 20 of the outer housing 2. The holding member 26 is configured to hold the switching member 293 so as to be slidable in the front-rear direction. In this embodiment, the holding member 26 includes a slide guide part 261 and support legs 263.

Figure 13:
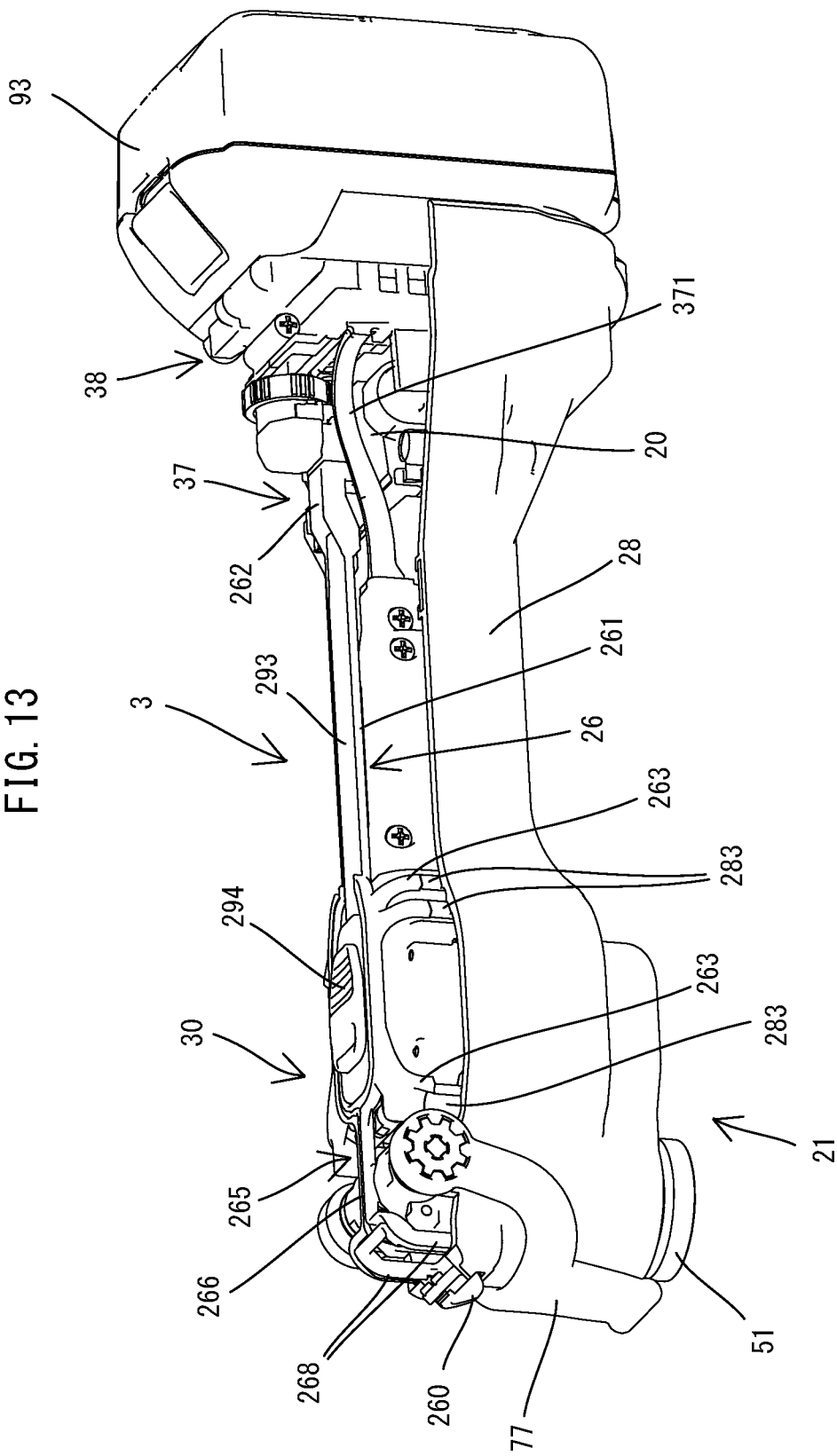
FIG. 13 is a perspective view of the oscillating multi-tool, wherein an upper shell has been removed therefrom.

The slide guide part 261 has an elongate shape extending in the front-rear direction and generally corresponding to the shape of the switching member 293. The slide guide part 261 has a recess (groove) formed on its upper surface. The switching member 293 is disposed in this recess so as to be slidable in the front-rear direction. Support legs 263 protrude from each of left and right edges of a front end portion of the slide guide part 261. As shown in FIG. 13, each of the support legs 263 extends downward in a curved shape.

Projections 283 are formed on each of left and right sides of a portion of the lower shell 28 that forms a portion of the front part 21. The projections 283 protrude upward from an upper end of the lower shell 28. The projections 283 are formed in (at) positions that respectively correspond to the support legs 263, and receive (support) lower end portions of the support legs 263, respectively. Further, a rear end part 262 of the holding member 26 is mounted on and engaged with the switch holder 20, which is elastically connected to the rear part 38 of the inner housing 3.

Figure 14:
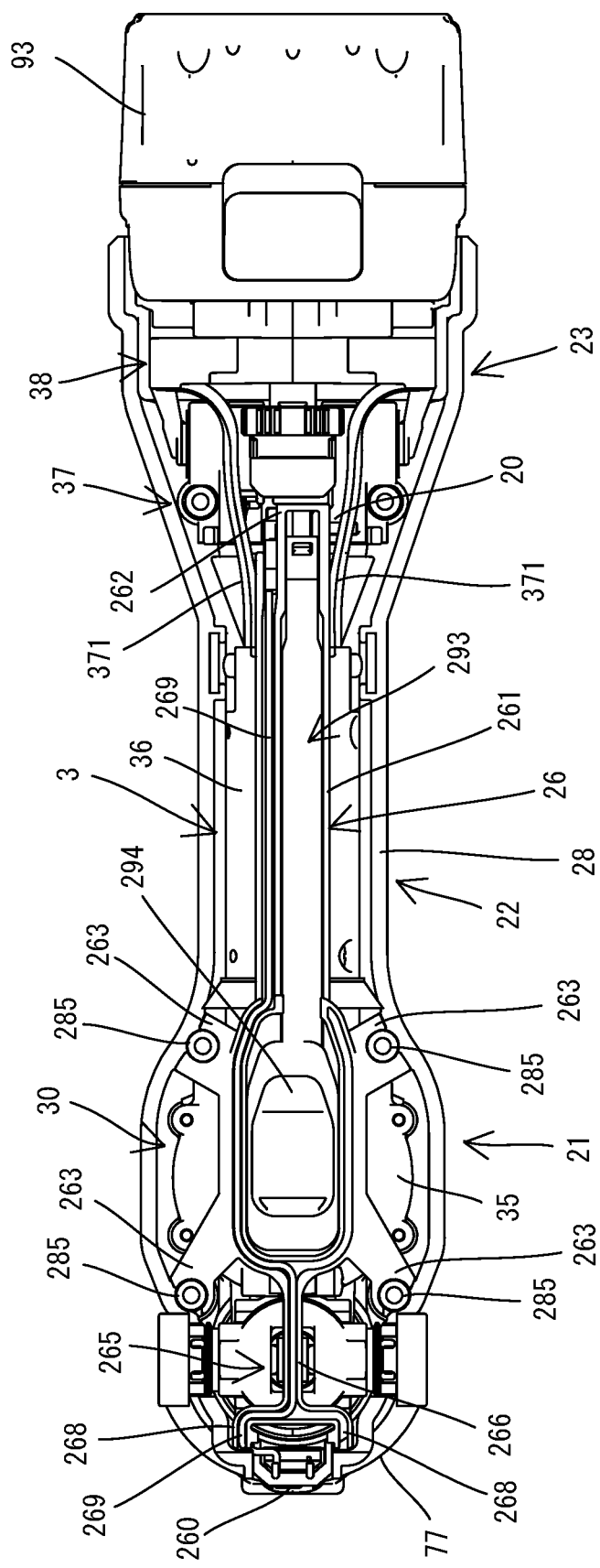
FIG. 14 is a plan view of the oscillating multi-tool, wherein the upper shell has been removed therefrom.

As shown in FIG. 14, each of the support legs 263 has a recess (notch) having a semicircular shape in a plan view. A total of four cylindrical parts 285 is provided on the inside of the lower shell 28. The four cylindrical parts 285 are disposed to respectively face (be disposed in) the recesses of the four support legs 263. An upper end of each cylindrical part 285 is located below an upper end of the lower shell 28. As shown in FIGS. 3 and 11, a total of four cylindrical parts 271 is provided on the upper shell 27. The four cylindrical parts 271 are disposed in (at) positions that respectively correspond to the four cylindrical parts 285. The cylindrical parts 271 protrude downward from a lower end of the upper shell 27. Each of the cylindrical parts 271 has a female thread on its inner periphery. To assemble the oscillating multi-tool 1, the inner housing 3 and the holding member 26 are first each housed and supported in the lower shell 28, and then the upper shell 27 is connected to the lower shell 28. At this time, the cylindrical parts 271 of the upper shell 27 are fitted in the recesses of the support legs 263 and then in the cylindrical parts 285 of the lower shell 28. Thus, the holding member 26 can be properly (accurately) positioned relative to the outer housing 2. Thereafter, the lower shell 28 and the upper shell 27 are fixed together by screws, which are inserted through the cylindrical parts 285 from below and threadedly engage with the cylindrical parts 271.

Although not shown in detail, when the upper shell 27 is connected to the lower shell 28, each of the support legs 263 extends along an inner surface of the upper shell 27 while being spaced apart from the inner housing 3 within the outer housing 2. Further, as shown in FIG. 12, the slide guide part 261 extends along a lower surface of an upper wall of the upper shell 27 while being spaced apart from the inner housing 3 within the outer housing 2.

Further, as shown in FIGS. 13 and 14, in this embodiment, the holding member 26 is configured to hold not only the switching member 293, but also a light unit 260 for lighting a working area of the tool accessory 91. For this purpose, the holding member 26 has a light-unit holding part 265 protruding forward from the slide guide part 261. The light-unit holding part 265 includes an extending part 266 and a pair of arms 268. The extending part 266 linearly extends forward from a center of a front end of the slide guide part 261 to forward of the rotary shaft 78. The arms 268 extend downward, bifurcating from a front end of the extending part 266, and hold the light unit 260. The holding member 26 is configured to guide a power supply wire 269 from the controller 383 to the light unit 260. The wire 269 is held in a groove that is formed in an upper surface of the holding member 26 and extends from the rear end part 262 to the light-unit holding part 265.

As shown in FIG. 8, a groove 267 having a rectangular section is formed in a lower surface of the extending part 266 and extends in the front-rear direction. The groove 267 is configured to be selectively fitted on (around) the large-diameter part of the eccentric part 781 of the rotary shaft 78. When the lever 77 is in the front position, the large-diameter part of the eccentric part 781 of the rotary shaft 78 protrudes upward and is fitted in the groove 267. Thus, when the tool accessory 91 is clamped, the light-unit holding part 265 is supported by the rotary shaft 78 and held apart from the inner housing 3 within the outer housing 2. To assemble the oscillating multi-tool 1, an assembler (a person who assembles the oscillating multi-tool 1) can place the rear part 38 and the light-unit holding part 265 on the switch holder 20 and the rotary shaft 78, respectively, so that they are stably held before mounting the inner housing 3 in the outer housing 2. This facilitates the mounting of the inner housing 3 and the holding member 26 in the outer housing 2.

The airflow paths within the housing 10 are now described.

As described above, in this embodiment, the housing 10 has a two-layered structure formed by the inner housing 3 and the outer housing 2. Therefore, air for cooling the motor 41 flows into the outer housing 2 from the outside, and then into the inner housing 3. This air cools the motor 41 within the inner housing 3, flows out of the inner housing 3, and then flows out of the outer housing 2.

Figure 5:
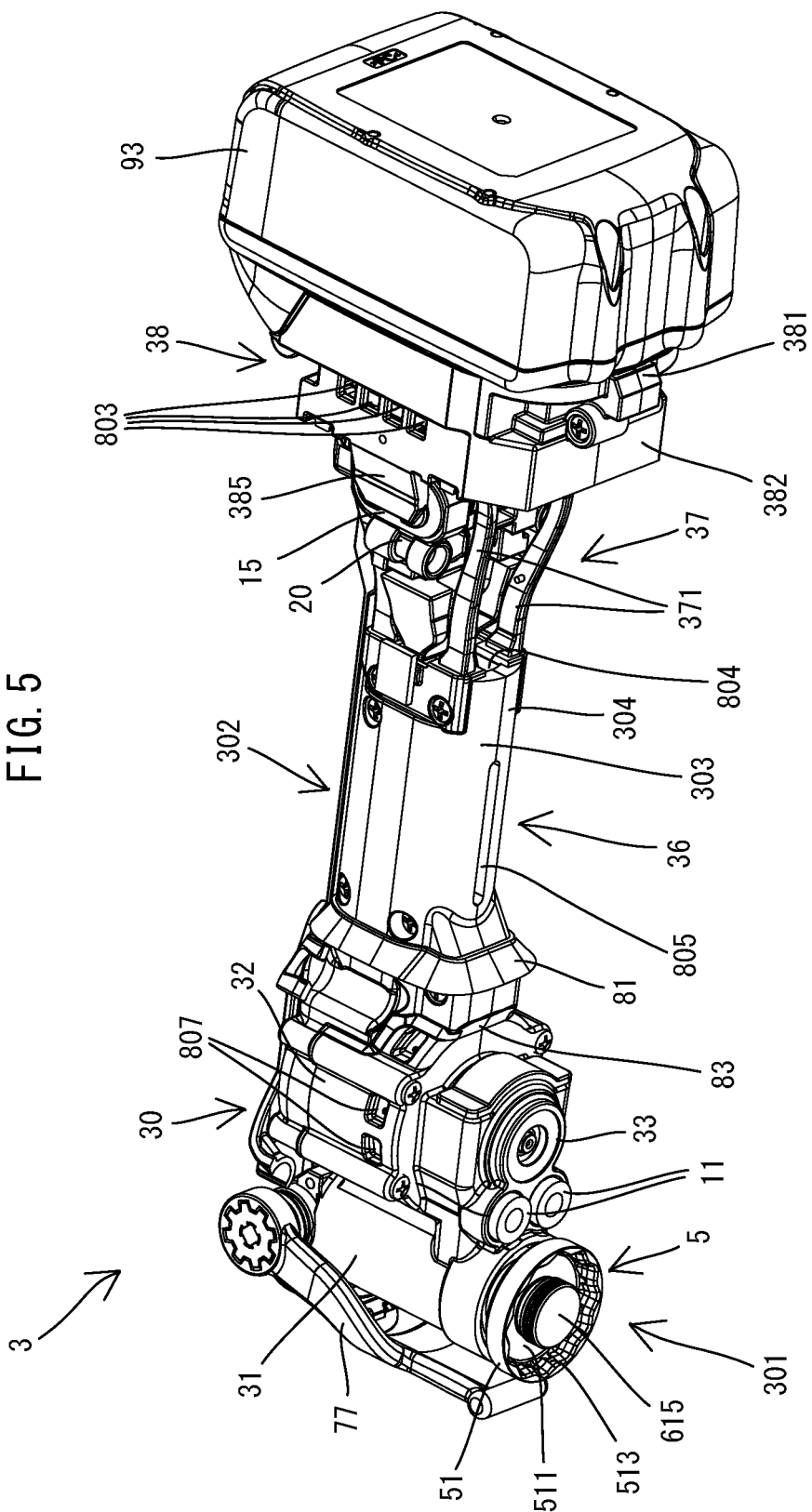
FIG. 5 is a perspective view of the inner housing as viewed from below.

In this embodiment, as shown in FIGS. 2 and 3, an opening is defined by a rear end (open end) of the rear part 23 of the outer housing 2 and the outer peripheral surface of the rear part 38 of the inner housing 3. This opening serves as an inlet 801 for drawing outside air into the outer housing 2. Further, as shown in FIGS. 2, 4 and 5, inlets 803, 804, 805 are formed in the inner housing 3 at different positions. The inlets 803 are a plurality of through holes formed in right and left walls of the rear part 38 (specifically, the controller housing part 382). The inlet 804 is the opening defined by the rear end of the cylindrical extending part 36. The inlets 805 are through holes respectively formed in upper and lower walls of the extending part 36 and extending linearly in the front-rear direction.

As shown in FIGS. 4 and 5, outlets 807 are formed in the front part 30. The outlets 807 serve to discharge the air, which has cooled the motor 41, from the inner housing 3. More specifically, the outlets 807 are through holes formed in a peripheral wall of the second housing part 32 and are located radially outward of the fan 43. Further, as shown in FIG. 6, outlets 809 are formed in a lower wall of the front part 21 (more specifically, in a region below the motor 41). The outlets 809 are through holes that serve to discharge the air from the outer housing 2. Although not shown in detail, the outlets 809 are arranged side by side in the left-right direction. Further, an opening is provided in the lower wall of the front part 21 such that the lower end portion of the spindle 5 is exposed to the outside through the opening, with a gap around the spindle 5. Therefore, the air discharged from the inner housing 3 can also flow out of the outer housing 2 through this gap.

Further, as shown in FIGS. 2, 3 and 5, in this embodiment, a partition 81 is provided between the outlets 807 and the inlets 803, 804, 805 of the inner housing 3. The partition 81 is configured to divide (partition or separate) a space (gap or clearance) formed between the inner housing 3 and the outer housing 2. Specifically, the partition 81 divides the space formed between the inner housing 3 and the outer housing 2 into a front space in which the outlets 807 are disposed and a rear space in which the inlets 803, 804, 805 are disposed. The partition 81 has a tapered tubular shape increasing in diameter toward the front. An end portion (i.e. a rear end portion) of the partition 81 having a smaller diameter is connected to a front end portion of the extending part 36. A front edge of the partition 81 is held in contact with the inner periphery of the outer housing 2 and the slide guide part 261 of the holding member 26. In this embodiment, the partition 81 is formed of an elastically deformable elastomer. The partition 81 is integrally formed with the plastic housing 302 (the left shell 303 and the right shell 304).

The paths of airflow generated by rotation of the fan 43 and flowing within the housing are as follows. First, part of the air drawn into the outer housing 2 through the inlet 801 flows into the rear part 38 through the inlets 803, cools the controller 383 and then flows forward through a front end opening of the rear part 38. Another part of the air drawn into the outer housing 2 from the inlet 801 flows forward through the gap between the rear part 23 and the rear part 38, and passes around the elastic ribs 371 and the switch holder 20. Then, part of this air flows into the cylindrical extending part 36 through the inlet 804, while another part of this air passes through the gap between the central part 22 and the extending part 36 and flows into the extending part 36 through the inlets 805. In this embodiment, owing to the inlets 804, 805 provided in the cylindrical extending part 36, the air flows into the extending part 36 and efficiently flows through the extending part 36 toward the front part 30.

The air led into the front part 30 mainly flows into the motor 41 through a through hole formed in a central portion of the circuit board disposed on the top of the motor 41, and flows downward between the stator and the rotor and thereby cools the motor 41. The air is then delivered (pushed) radially outward by the fan 43 and flows out of the inner housing 3 through the outlets 807 of the second housing part 32, and then flows out of the housing 10 through the outlets 809 of the outer housing 2.

The partition 81 is disposed between the outlets 807 and the inlets 803, 804, 805, as described above. Therefore, the partition 81 can reduce the possibility that the air that has been warmed while cooling the motor 41 and that has flowed out through the outlets 807 will flow within the outer housing 2 and enter the inner housing 3 through the inlets 803, 804, 805 again. Thus, the partition 81 serves to reduce the possibility of a decrease of efficiency in cooling the motor 41.

Because the partition 81 is formed of elastomer and has a tapered tubular shape, the partition 81 will deform in response to a pressure difference between the front space and the rear space, whereby a peripheral edge of the partition 81 will be pressed into close contact with the inner periphery of the outer housing 2 and the slide guide part 261. Therefore, the partition 81 can reliably block the air that has flowed out through the outlets 807 from flowing into the rear space in which the inlets 803, 804, 805 are disposed. Further, the elastically deformable partition 81 can reduce the possibility that a gap will form between the partition 81 and the outer housing 2 when the inner housing 3 and the outer housing 2 move relative to each other.

In some known oscillating multi-tools, the motor is arranged (oriented) such that the rotational axis of the output shaft (i.e. the rotational axis of the fan) intersects the driving axis of the spindle and extends in parallel to the longitudinal axis of the inner housing. In this type of known oscillating multi-tools, the air that flows in through the inlets and flows inside the inner housing in (along) the longitudinal direction can pass the fan without changing the direction of flow, and will then flow out via the outlets. With such an airflow path, the air that has flowed out through the outlets does not easily flow toward the inlets.

In the oscillating multi-tool 1 of this embodiment, however, the motor 41 is arranged (oriented) such that the rotational axis A2 of the output shaft 415 (i.e. the rotation axis A2 of the fan 43) extends in parallel to the driving axis A1 of the spindle 5 and intersects the extension direction of the longitudinal axis of the inner housing 3. Owing to this arrangement, the spindle 5 and the motor 41 can be arranged close to each other, so that the oscillating multi-tool 1 can be made more compact in the longitudinal direction. On the other hand, the direction of the airflow within the inner housing 3 must change in the vicinity of the motor 41. Specifically, the air that has flowed in through the inlets 803, 804, 805 flows forward within the extending part 36 along the longitudinal axis of the inner housing 3, changes the direction of flow in (at) an upper portion of the front part 30 (more specifically, in (at) the upper portion of the second housing part 32), and then flows downward within (through) the motor 41 and out via the outlets 807. With such a structure, the air that has flowed out through the outlets 807 can more easily flow toward the inlets 803, 804, 805, compared with the airflow paths in the above-described known type of oscillating multi-tools. Therefore, by providing the partition 81 in this embodiment, an advantageous cooling effect can be achieved.

In this embodiment, because the inner housing 3 is formed by connecting the metal housing 301 and the plastic housing 302, a gap may be formed at the connection (boundary) between the metal housing 301 and the plastic housing 302. Therefore, as a countermeasure, a closing member (blocking member, plugging member) 83 is provided in the oscillating multi-tool 1, as shown in FIG. 5, to close any possible gap between the metal housing 301 and the plastic housing 302.

In this embodiment, a front end of the extending part 36 is in abutment with the second housing 32, but it is possible that a slight gap could form therebetween. Therefore, the closing member 83 is configured to close the gap between the second housing 32 and the extending part 36. The cover part 35 and an upper end portion of the second housing part 32 are fixed into close contact with each other by screws. Further, the left and right shells 303, 304 of the plastic housing 302 are also fixed into close contact with each other by screws. Therefore, in this embodiment, closing members for closing boundaries of these portions are not provided. Similar closing members, however, may also be provided to (at) these portions.

In this embodiment, the closing member 83 is formed of elastomer, like the partition 81. The closing member 83 is integrally formed with the plastic housing 302 (the left and right shells 303, 304) along the front end of the extending part 36. When the metal housing 301 and the plastic housing 302 are connected together, the closing member 83 comes into close contact with the outer peripheral surface of the second housing part 32 and closes the gap. Therefore, the closing member 83 can reduce the possibility that the air that has been warmed while cooling the motor 41 and that has flowed out through the outlets 807 will flow into the inner housing 3 again through the gap between the second housing part 32 and the extending part 36. Thus, the closing member 83 serves to reduce the possibility of a decrease of efficiency in cooling the motor 41. If air were to (hypothetically) flow in through the gap between the second housing part 32 and the extending part 36, this air could be introduced into the motor 41 from above by the fan 43. Therefore, it is advantageous to close the gap between the second housing part 32 and the extending part 36.

In this embodiment, the partition 81 and the closing member 83 are both integrally formed with the inner housing 3 (the plastic housing 302) as described above. This configuration makes assembly easier than in an embodiment in which the partition 81 and the closing member 83 are formed separately from the inner housing 3 and the outer housing 2. Further, the switching member 293 and the holding member 26 are held within the outer housing 2. Therefore, assembly of the inner housing 3 and the outer housing 2 is facilitated by providing the partition 81 on the inner housing 3.

Figure 15:
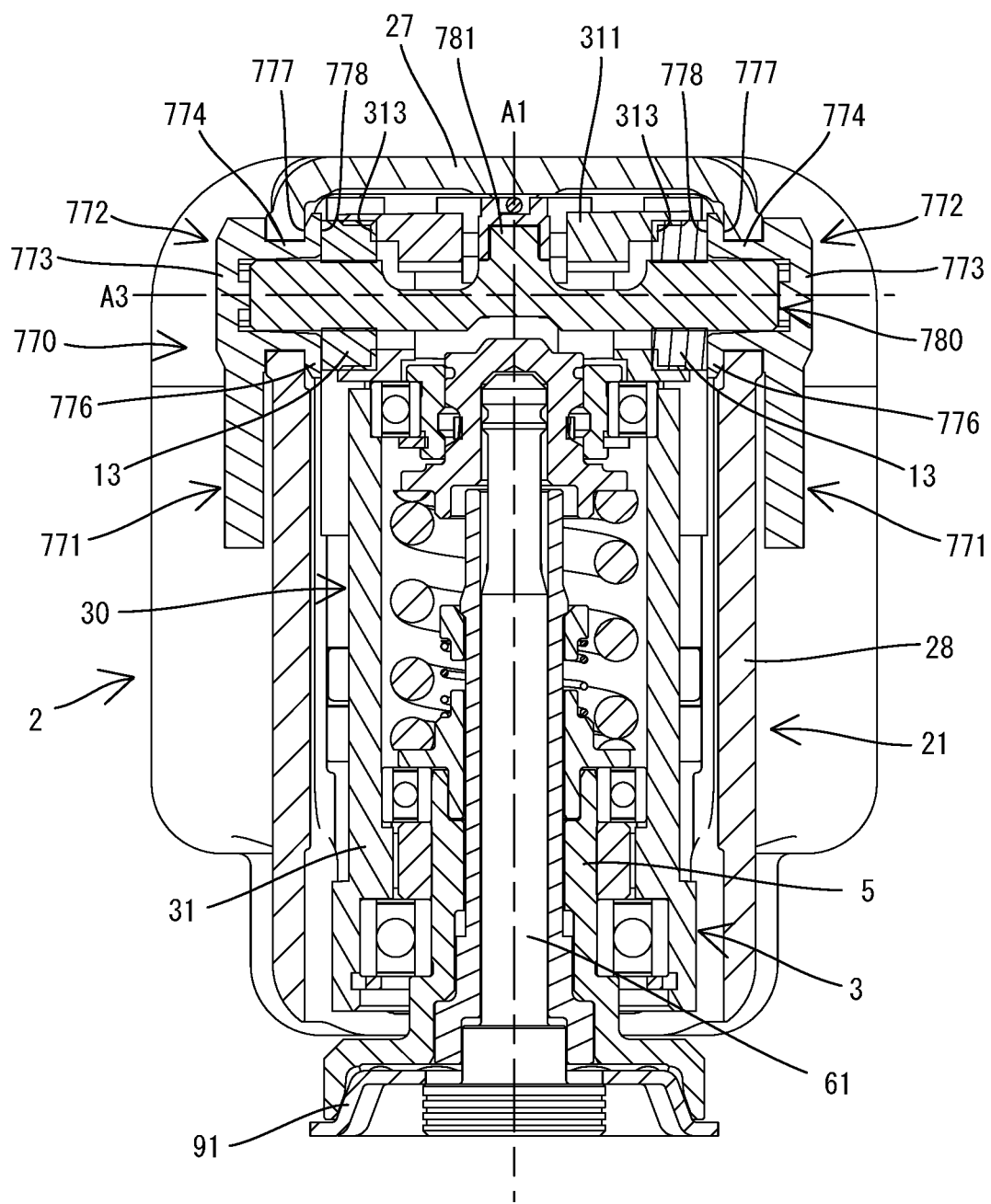
FIG. 15 is a sectional view, corresponding to FIG. 8, for illustrating an arrangement of a lever and a rotary shaft according to a modified embodiment of the present teachings.
Figure 16:
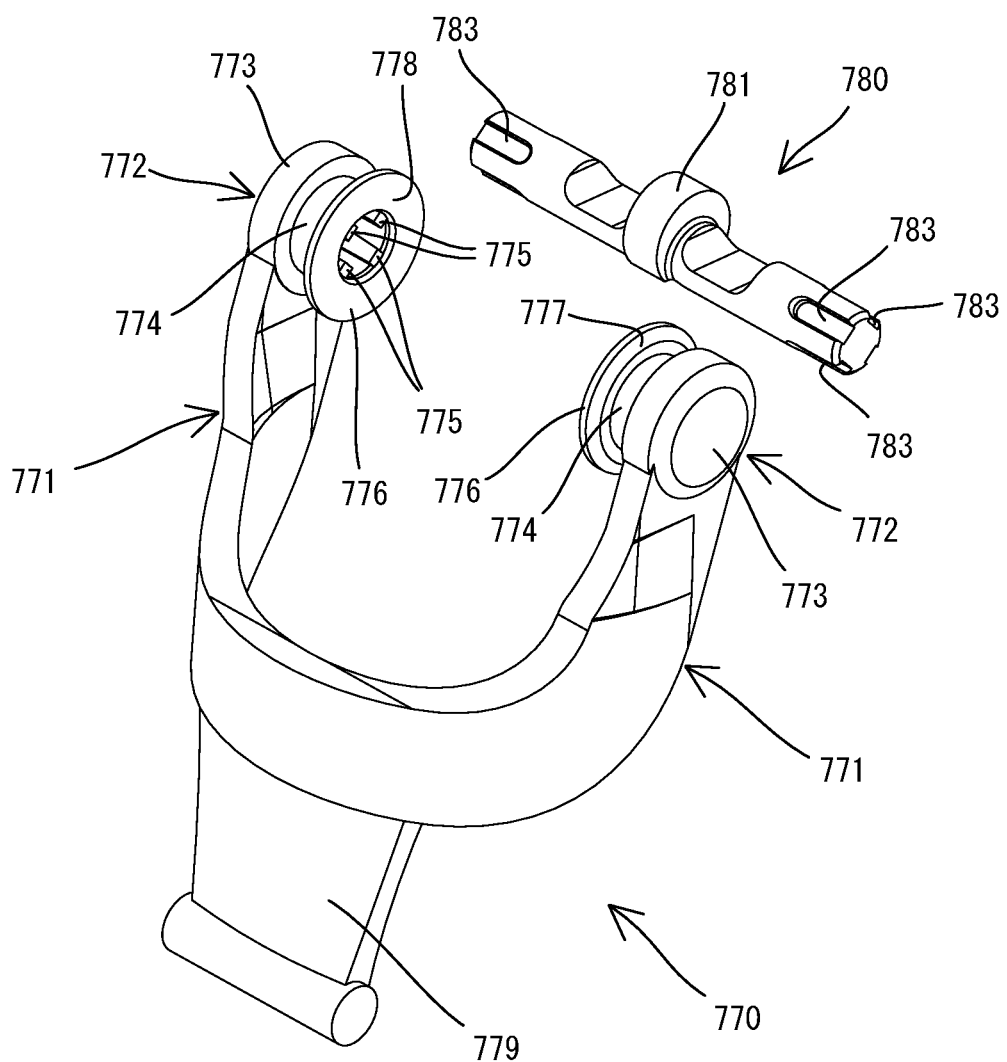
FIG. 16 is an exploded, perspective view of the lever and the rotary shaft of the modified embodiment.

A modified embodiment is now described, with reference to FIGS. 15 and 16. In this modified embodiment, a lever 770 and a rotary shaft 780, which are respectively modified examples of the lever 77 and the rotary shaft 78 (see FIG. 1 and FIG. 8), are described. It is noted that structures or components that are substantially identical to those of the above-described embodiment are given the same reference numerals as in the above-described embodiment, and may be omitted in the drawings and the following description.

As shown in FIGS. 15 and 16, like the lever 77 (see FIG. 1), the upper portion of the lever 770 is generally U-shaped; overall, the lever 770 (and the lever 77) is Y-shaped. The lever 770 is a single member that is integrally molded from synthetic resin/polymer. The lever 770 includes a pair of arms 771 and a grip part (handle) 779.

The arms 771 each have a first end portion and a second end portion. The first end portions of the arms 771 are engaged with an upper left portion and an upper right portion of the front part 21 of the outer housing 2, respectively. The first end portion of the arm 771 is hereinafter also referred to as an engagement portion 772. The left and right arms 771 extend along a left side surface and a right side surface of the front part 21 in a curved manner, and further extend such that the second end portions of the arms 771 are connected with each other at a center of the front part 21 in the left-right direction. The arms 771 have flexibility and are elastically deformable (bendable) in a direction in which the distance therebetween changes (i.e. in the left-right direction).

The engagement portion 772 of each arm 771 is engaged with the outer housing 2 and includes a circular plate part 773, a cylindrical part 774 and an inner flange 776. The circular plate part 773 is a circular plate-like portion that is disposed on an outer side (exterior) of the outer housing 2 (specifically, on the exterior of the left and right side walls of the outer housing 2). The cylindrical part 774 is a bottomed hollow circular cylindrical portion. The bottom of the cylindrical part 774 is closed by the circular plate part 773. The cylindrical parts 774 of the of arms 771 protrude from the respective circular plate parts 773 toward each other. The cylindrical parts 774 are held between the upper shell 27 and the lower shell 28, and extend along the rotational axis A3 in the left-right direction. A plurality of projections 775 is formed inside each of the cylindrical parts 774. The projections 775 are arranged at equal intervals in the circumferential direction. The projections 775 each extend from an opening end of the cylindrical part 774 toward the circular plate part 773 in the left-right direction. Each of the inner flanges 776 is an annular portion that protrudes radially outward from the end portion of the cylindrical part 774 that has the opening. The inner flanges 776 are each disposed on an inner side (in the interior) of the outer housing 2 (specifically, inside of the left and right side walls of the outer housing 2).

The grip part 779 is a plate-like portion that protrudes from a portion where the arms 771 are connected with each other. The user can grasp the grip part 779 to pivot the lever 770.

Like the rotary shaft 78 (see FIG. 8), the rotary shaft 780 extends through the inner housing 3 in the left-right direction. The eccentric part (cam part) 781 is provided on (at) a central portion of the rotary shaft 780.

Left and right end portions of the rotary shaft 780 are connected to the engagement parts 772 of the left and right arms 771, respectively. More specifically, a plurality of engagement grooves 783 is formed in the outer periphery of both of the end portions of the rotary shaft 780. The engagement grooves 783 are arranged at equal intervals in the circumferential direction. The engagement grooves 783 each extend from an end of the rotary shaft 780 toward the center in the left-right direction. The engagement grooves 783 each have a shape that conforms to the projection 775 of the engagement part 772. The end portions of the rotary shaft 780 are fitted in the engagement parts 772 of the of arms 771 in a state in which the engagement grooves 783 and the projections 775 are engaged (meshed) with each other. Thus, the rotary shaft 780 is supported by the outer housing 2 via the lever 770, such that the rotary shaft 780 is rotatable together with the lever 770.

An assembler can easily assemble the lever 770 and the rotary shaft 780 to (in) the housing 10 in the following manner.

The assembler first inserts the rotary shaft 780 through the through hole extending through the cover 311 in the left-right direction. The assembler then fits the elastic members 13 around the left and right end portions of the rotary shaft 780. When the inside portions of the elastic members 13 are fitted in the recesses 313 of the cover 311, respectively, the rotary shaft 780 is stably held by the inner housing 3 via the elastic members 13. The assembler can then elastically deform the left and right arms 771 such that the engagement parts 772 are spaced farther away from each other to increase the distance between engagement parts 772. The assembler fits the engagement parts 772 on the left and right end portions of the rotary shaft 780, such that the engagement grooves 783 and the projections 775 engage (mesh) with each other. Owing to the elastic deformability of the polymer material forming the lever 770, the arms 771 return to their initial positions in which the engagement parts 772 are closer to each other due to the elastic restoring force. The rotary shaft 780 and the lever 770 are thus connected to each other so as to be rotatable together.

The left and right cylindrical parts 774 are then held (placed) between the upper shell 27 and the lower shell 28 in the up-down direction and, in this state, the upper shell 27 and the lower shell 28 are connected together by the screws. The lever 770 and the rotary shaft 780 are thus supported by the outer housing so as to be rotatable around the rotational axis A3, and the assembly is completed.

When the assembly is completed, the circular plate part 773 and the inner flange 776 of the engagement part 772 are disposed on the outer side and on the inner side, respectively, of the outer housing 2, such that the side wall of the outer housing 2 is held between the circular plate part 773 and the inner flange 776. Owing to this arrangement, movement of the engagement part 772 in the left-right direction is blocked, and thereby elastic deformation of the arms 771 is restricted. In particular, the inner flanges 776, which are disposed on the inner side (in the interior) of the outer housing 2, block laterally outward movement of the engagement parts 772, and thereby effectively prevent the lever 770 from being disconnected from the rotary shaft 780.

Further, each inner flange 776 has an outside surface 777 that faces the circular plate part 773 and an inside surface 778 that is on the opposite side from the the circular plate part 773. The outside surface 777 and the inside surface 778 extend in parallel to each other and are disposed opposite from each other in the left-right direction. The outside surface 777 and the inside surface 778 abut on the inner surface of the side wall of the outer housing 2 and on an end surface of the circular cylindrical elastic member 13, respectively. With such an arrangement, the outer housing 2 and the elastic member 13 can be efficiently connected via the inner flanges 776, which also serve to prevent the lever 770 from being disconnected from the rotary shaft 780.

Correspondences between the features of the above-described embodiments and the features of the present disclosure are as follows. The features of the above-described embodiments are merely exemplary and do not limit the features of the present disclosure or the present invention.

The oscillating multi-tool 1 is an example of the "power tool". The inner housing 3 is an example of the "housing". The spindle 5 and the tool mounting part 51 are examples of the "spindle" and the "tool mounting part", respectively. The driving axis A1 is an example of the "driving axis". The clamp shaft 61 is an example of the "clamp shaft". The clamp spring 65 is an example of the "first biasing member". The clamp member 71 is an example of the "engagement member". The collar 75 is an example of the "first holding member". The lever 77 is an example of the "manually operable member". The push-down sleeve 671 is an example of the "push-down member". The inclined surface 513 and the inclined surface 913 are examples of the "first inclined surface" and the "second inclined surface", respectively. The holder 73 is an example of the "second holding member". The groove 753 of the collar 75 is an example of the "first recess". The holding recess 733 of the holder 73 is an example of the "second recess". The biasing spring 675 is an example of the "second biasing member". The spring receiving member 57 is an example of the "spring receiving part". The elastic ring 718 is an example of the "third biasing member".

The above-described embodiments are merely exemplary embodiments of the present disclosure, and a power tool according to the present disclosure is not limited to the oscillating multi-tool 1 of the above-described embodiment. For example, the following modifications may be made. Further, one or more of these modifications may be employed in combination with the oscillating multi-tool 1 of the above-described embodiment or any one of the claimed features.

For example, the structure of the clamping mechanism 60 (for example, the shapes, arrangements and support structures of the clamp shaft 61 and the clamp spring 65, and the components, shape, arrangement and support structure of the lock mechanism 7) may be appropriately changed. Examples of employable modifications are as follows.

For example, the clamp shaft 61 may be biased upward relative to the spindle 5, not via the holder 73 and the clamp member 71, but directly by the clamp spring 65. Instead of the compression coil spring, the clamp spring 65 may be embodied, for example, as a tension coil spring, a torsion spring, a disc spring or a rubber spring.

In the above-described embodiment, the holder 73 has several functions (specifically, the functions of holding the clamp members 71, receiving the biasing force of the clamp spring 65, and pushing down the push-down sleeve 671 in response to the unclamping operation of the lever 77). The holder 73, however, need not have all of these functions. These functions may be performed by a plurality of different members (structures, components).

The clamp members 71 may be directly held by the collar 75. In such a modified embodiment, the holder 73 may be omitted. Furthermore, in such a modified embodiment, for example, the clamp members 71 may be directly or indirectly held by the inner housing 3 so as to be movable in the radial direction, and the collar 75 may be movable in the up-down direction relative to the clamp members 71 and the spindle 5. In such a modified embodiment, the collar 75 may be configured to push down the push-down sleeve 671 while the collar 75 moves downward. Further, the collar 75 and the clamp members 71 may be configured such that the clamp members 71 move relative to the collar 75 from the lock positions to the unlock positions when the collar 75 moves downward in response to the unclamping operation of the lever 77.

In the above-described embodiment, two of the clamp members 71 are provided, but three or more clamp members 71 may be provided. An engagement member that is configured to engage with the clamp shaft 61 and hold the clamp shaft 61 in the clamp position is not limited to the above-described clamp member(s) 71. For example, the (each) engagement member may be embodied as a ball. In such a modified embodiment, in place of the groove part 612, an annular groove may be formed in the upper end portion of the clamp shaft 61. The groove may have a semicircular cross-section, corresponding to the ball(s). One or more of such balls may be provided. The structure of the collar 75 may also be appropriately changed, in accordance with such a change of the design of the clamp members 71. Further, the lock mechanism 7 may be disposed inside the spindle 5, for example, not above the spindle 5.

The shape, arrangement and support structure of the push-down sleeve 671 or pusher may be appropriately changed, as long as the push-down sleeve 671 is configured to be pushed down, e.g., by the holder 73 (or the clamp members 71) and/or the collar 75, and to push down the tool accessory 91. For example, the shape of the large-diameter part 673 may be appropriately changed. In order to more reliably eliminate sticking of the tool accessory 91 to the tool mounting part 51 (i.e. to detach the tool accessory from the tool mounting part 51), however, it may be preferable that the large-diameter part 673 comes into contact with the tool accessory 91 at multiple points (e.g., at 2 points that are diametrically (or at least substantially diametrically) opposite of each other, or at least 3 points that define a plane) around the clamp shaft 61, instead of at only one point. For example, the large-diameter part 673 may come into contact with the tool accessory 91 in a region surrounding the clamp shaft 61 in the circumferential direction. Further, as was explained above, at least one rod-like or bar-like push-down member may be provided, in place of the hollow cylindrical push-down sleeve 671. Although the holder 73 abuts on and pushes down the push-down sleeve 671 in the above-described embodiment, the holder 73 may instead push down the push-down sleeve 671 via another member. Alternatively, the push-down sleeve 671 may be connected to the lower end of the holder 73 so as to be movable in the up-down direction together with the holder 73.

Instead of the compression coil spring, the biasing spring 675 for the push-down sleeve 671 may be embodied, for example, as a tension coil spring, a torsion spring, a disc spring or a rubber spring. Further, the position of the biasing spring 675 is not limited to that of the above-described embodiment.

The elastic ring 718 for temporarily holding the clamp shaft 61 when the clamp members 71 are located in the unlock positions may be an elastic element other than rubber (for example, a metal elastic ring, such as a garter spring, more preferably an extension garter spring), or it may be omitted.

The shapes, arrangements and support structures of the lever 77, 770 and the rotary shaft 78, 780 may be appropriately changed, as long as one of the clamp members 71 and the collar 75 (or its modification) is moved downward in response to an external manual operation performed by the user. For example, the lever 77, 770 may be modified to be rotatable (pivotable) around a pivot axis extending in the front-rear direction or in the up-down direction. The rotary shaft 78, 780 may be modified in accordance with such a change of the lever 77, 770. Further, the rotary shaft 78, 780 (the eccentric part 781) may push down the holder 73 not directly in abutment therewith but via another member.

The structure (for example, the shape and support structure) of the spindle 5 is not limited to that of the above-described embodiment, but may be appropriately changed. For example, in the above-described embodiment, the tool mounting part 51 has the recess 351 that corresponds to the protruding part 911 of the tool accessory 91, so that the tool accessory 91 is secured (fixed, attached) to the tool mounting part 51 in a state in which the inclined surface 913 is in abutment with the inclined surface 513 of the tool mounting part 51. However, the tool mounting part 51 may have a planar lower surface, to (on) which a tool accessory having a planar upper surface is secured (fixed, attached). In such an embodiment, in order to position the tool accessory relative to the tool mounting part 51, the tool mounting part 51 and the tool accessory may have projections and fitting holes, respectively. In such a modified embodiment, like the inclined surfaces 513, 913, the projections and the fitting holes may have respective inclined surfaces that are inclined (oblique) relative to the driving axis A1 and conform (are complementary) to each other.

The structures (for example, the shapes, structures (elements) housed therein and arrangements) of the housing 10, the motor 41 and the transmitting mechanism 45 may be appropriately changed. For example, the elastic members 11, 13, 15 disposed between the inner housing 3 and the outer housing 2 may be formed of a material that is different from the material of the above-described embodiment. For example, rubber or a foam of a different kind of synthetic resin/polymer can be employed. The shapes, numbers and positions of the elastic members 11, 13, may be different from those of the above-described embodiment. The housing 10 need not be a vibration-isolating housing that includes the outer housing 2 elastically connected to the inner housing 3. In other words, a housing having a single-layer structure may be employed. Components of the outer housing 2 and the inner housing 3 and the manner of connecting the outer housing 2 and the inner housing 3 may also be appropriately changed. The airflow paths within the housing 10 may be different from those of the above-described embodiment. Further, for example, the motor 41 may be an AC motor. In some aspects of the present teachings, the motor 41 may be housed within the grip part (the central part 22) of the housing 10 such that the rotational axis A2 of the output shaft 415 is orthogonal or oblique to the driving axis A1.

Further, in view of the nature of the present disclosure, the above-described embodiment and the modifications thereof, the following Aspects 1 to 5 can be provided. Any one of the following Aspects 1 to 5 can be employed alone or in combination with any one of the oscillating multi-tools 1 of the above-described embodiment, the above-described modifications and the claimed features.

(Aspect 1)

The manually operable member (lever) is configured to move the engagement member(s) downward relative to the first holding member in response to the unclamping operation, and the second position of the engagement member(s) is located below the first position.

(Aspect 2)

The push-down sleeve is inserted through the spindle, and the second holding member is configured to abut on an upper end of the push-down sleeve and push down the sleeve above the spindle when the second holding member moves downward.

(Aspect 3)

A first one of the clamp shaft and the engagement member(s) has a recess, and a second (other) one of the clamp shaft and the engagement member(s) has a projection configured to engage (mesh) with the recess when the engagement member(s) is (are) placed in the first position.

The groove part 612 and the ridge part 717 are examples of the "recess" and the "projection", respectively, in this Aspect.

(Aspect 4)

A multi-tool comprising:
a spindle configured to be pivoted in an oscillating manner around a driving axis that is parallel to an up-down direction of the multi-tool;
a tool mounting surface defined at a lower end of the spindle;
a clamping shaft disposed coaxially with the spindle and configured to be movable relative to, and removable from, the spindle;
a clamping head defined at a lower end of the clamping shaft;
a first biasing member configured to bias the clamping shaft upward in the up-down direction toward a clamping position at which a tool accessory is clampable between the clamping head and the tool mounting surface;
a manually operable lever; and
a pusher extending in parallel to the spindle;
wherein:
in response to pivoting of the manually operable lever toward an unclamping position, the pusher is configured to move downward in the up-down direction relative to the spindle to push the tool accessory away from the tool mounting surface of the spindle.

(Aspect 5)

The multi-tool according to Aspect 4, wherein:
the tool mounting surface comprises a first inclined and/or curved surface that extends obliquely to or in a non-parallel manner with the driving axis, and
the tool accessory has a second inclined and/or surface that is complementary to the first inclined and/or curved surface and mates with the first inclined and/or curved surface at least multiple contact points disposed around the driving axis when the tool accessory is clamped between the clamping head and the tool mounting surface of the spindle.

The following Aspects 6 to 23 are described with the aim of providing techniques for avoiding or minimizing a decrease of efficiency in cooling a motor of a power tool having an inner housing and an outer housing. Each one of the following Aspects 6 to 23 may be employed individually or in combination with any one or more of the other aspects. Alternatively, at least one of the following Aspects 6 to 23 may be employed in combination with at least one of the oscillating multi-tools 1 of the above-described embodiment, the above-described modifications and aspects, and the claimed features.

(Aspect 6)

A power tool configured to drive a tool accessory in an oscillating manner, the power tool comprising:
a motor;
a spindle that is supported to be rotatable around a driving axis and configured to pivotally oscillate the tool accessory that is removably mounted to (on) the spindle using power (motive power) generated by the motor;
an inner housing that houses the motor and the spindle and that has at least one inlet (port, opening) and at least one outlet (port, opening);
an outer housing that houses (surrounds) the inner housing and that is elastically connected to the inner housing to be movable relative to the inner housing; and
a partition that is disposed between the at least one inlet and the at least one outlet, the partition dividing a space (clearance, empty space, airflow path) formed between the inner housing and the outer housing.

In the power tool of this Aspect, at least one space (gap, clearance) is formed between the inner housing and the outer housing that are elastically connected to be movable relative to each other. Air flows into the inner housing through the at least one inlet, cools the motor, and then flows out into this space through the at least one outlet. The partition is provided in this space between the at least one outlet and the at least one inlet, so that the space is divided into a first space (inlet-side space) in which the at least one inlet is disposed and a second space (outlet-side space) in which the at least one outlet is disposed. The partition can reduce the amount of the air, which has flowed out through the at least one outlet into the second space (outlet-side space), that flows into the first space (inlet-side space) again. This can reduce the possibility that the air that has been warmed while cooling the motor will flow into the inner housing again through the at least one inlet, thereby avoiding a decrease of efficiency in cooling the motor.

(Aspect 7)

The power tool as defined in Aspect 6, wherein the partition is provided on (attached to) the inner housing.

According to this aspect, an assembler can easily assemble the inner housing and the outer housing even if there is a component to be assembled (placed) into the outer housing.

(Aspect 8)

The power tool as defined in Aspect 7, wherein the partition is integrally formed with the inner housing.

According to this aspect, the assembly can be further facilitated.

(Aspect 9)

The power tool as defined in any one of Aspects 6 to 8, wherein the partition is formed of an elastic element configured to deform under pressure, e.g., in response to changes in air pressure between the two spaces divided by the elastic element.

According to this aspect, the partition can deform in response to an air pressure difference between the first space (inlet-side space) and the second space (outlet-side space) across the partition, and thereby come into closer contact with the inner housing and the outer housing. This can further reduce the amount of the air that flows into the first space (inlet-side space) again.

(Aspect 10)

The power tool as defined in any one of Aspects 6 to 9, wherein:
the inner housing is formed by connecting a plurality of members, the power tool further comprises a closing member that at least partly closes a gap between the plurality of members.

According to this aspect, the possibility can be reduced that the air that has been warmed while cooling the motor will flow into the inner housing again through the gap between the plurality of members that form the inner housing.

(Aspect 11)

The power tool as defined in Aspect 10, wherein both of the partition and the closing member are integrally formed with either the inner housing or the outer housing.

(Aspect 12)

The power tool as defined in Aspect 11, wherein both of the partition and the closing member are integrally formed with the inner housing.

According to Aspects 9 and 10, the assembly is further facilitated.

(Aspect 13)

The power tool as defined in any one of Aspects 6 to 12, wherein the inner housing includes:
a first end part that houses at least the spindle; and
a cylindrical part that extends in a longitudinal direction of the outer housing and that has an open end and a connecting end connected to the first end part,
wherein the at least one outlet is formed in the first end part, and
wherein the at least one inlet includes at least one of a first opening of the open end of the cylindrical part and a second opening formed in a peripheral wall that defines the cylindrical part.

According to this aspect, an efficient path can be defined along which the air flows in the longitudinal direction within the elongate cylindrical part toward the first end part.

(Aspect 14)

The power tool as defined in any one of Aspects 6 to 13, wherein:
the motor has an output shaft, and
the spindle and the motor are arranged such that the driving axis and a rotational axis of the output shaft extend in parallel to each other.

According to this aspect, the spindle and the motor can be arranged relatively close to each other, so that a power tool that is more compact in the longitudinal direction can be obtained.

(Aspect 15)

The power tool further comprises a fan that is configured to rotate together with the output shaft.

(Aspect 16)

The partition is disposed closer to the at least one outlet than to the at least one inlet.

(Aspect 17)

The outer housing has at least one inlet and at least one outlet, and
the partition divides the space between the at least one inlet of the outer housing and the at least one outlet of the outer housing.

(Aspect 18)

The partition divides the space formed between the inner housing and the outer housing into an inlet-side space in which the at least one inlet is located and an outlet-side space in which the at least one outlet is located, and
the closing member is provided on (at) a portion of the inner housing located in the outlet-side space.

(Aspect 19)

The power tool further comprises a fan that is configured to rotate together with the output shaft,
the inner housing includes a motor housing part that houses the motor and the fan, and
the closing member is configured to close a gap between the motor housing part and a member that is connected to the motor housing part.

(Aspect 20)

The closing member is formed of an elastic element, e.g., made of an elastomer.

(Aspect 21)

The inner housing is an elongate member having a longitudinal axis that intersects the driving axis,
the inner housing includes a first end part that houses at least the spindle, a second end part located opposite to the first end part, and a connecting part extending in a direction of the longitudinal axis and connecting the first end part and the second end part,
the partition is provided on the connecting part,
the at least one outlet is provided in the first end part, and
the at least one inlet is provided in at least one of the second part and the connecting part.

(Aspect 22)

The first end part houses the motor.

(Aspect 23)

The connecting part includes:
a cylindrical part having an open end and a connecting end that is connected to the first end part, the cylindrical part extending toward the second end part; and
a plurality of connecting members connecting the open end of the cylindrical part and the second end part, and
wherein the at least one inlet includes at least one of a first opening formed in the second end part, a second opening of the open end of the cylindrical part and a third opening formed in a peripheral wall that defines the cylindrical part.

Correspondences between the features of the above-described embodiment and the features of the Aspects 6 to 23 are as follows. The features of the above-described embodiment are merely exemplary and do not limit the features of the present disclosure or the present invention.

The oscillating multi-tool 1 is an example of the "power tool". The motor 41 is an example of the "motor". The spindle 5 is an example of the "spindle". The driving axis A1 is an example of the "driving axis". The inner housing 3 is an example of the "inner housing". Each of the inlets 803, 804, 805 is an example of the "inlet of the inner housing". The outlet 807 is an example of the "outlet of the inner housing". The outer housing 2 is an example of the "outer housing". The partition 81 is an example of the "partition". The metal housing 301 and the plastic housing 302 are an example of the "plurality of members". The closing member 83 is an example of the "closing member". The front part 30 of the inner housing 3 is an example of the "first end part". The extending part 36 is an example of the "cylindrical part". The output shaft 415 is an example of the "output shaft". The rotational axis A2 is an example of the "rotational axis of the output shaft". The fan 43 is an example of the "fan". The inlet 801 and the outlet 809 are examples of the "inlet of the outer housing" and the "outlet of the outer housing". The second housing part 32 is an example of the "motor housing part". The rear part 38 is an example of the "second end part". The elastic ribs 371 are an example of the "plurality of connecting members".

The power tool as defined in Aspects 6 to 23 is not limited to the oscillating multi-tool 1 of the above-described embodiment. For example, the following modifications may be made. At least one of these modifications may be adopted in combination with at least one of the oscillating multi-tools 1 of the above-described embodiment, the above-described modifications and aspects, and the claimed features.

For example, the structures (for example, the shapes, components and connecting manner) of the housing 10 (the inner housing 2 and the outer housing 3) may be appropriately changed. For example, each of the metal housing 301 and the plastic housing 302 of the inner housing 3 may have a different shape. The plastic housing 302 may be formed by connecting an upper shell and a lower shell. The outer housing 2 may be formed by connecting a left shell and a right shell. The inner housing 3 may include only the front part 30 (the metal housing 301) that houses the spindle 5, etc. Further, the front part 30 and the rear part 38 may be connected only via the extending part 36. A single elastic element having a lower elastic modulus than the extending part 36 may be employed, in place of the elastic ribs 371.

The airflow paths within the housing 10 may be different from those of the above-described embodiment. Specifically, the shapes, numbers, positions etc., of the inlets 801, 803, 804, 805 and the outlets 807, 809 may be appropriately changed, in accordance with or regardless of a change in the housing 10 and the structures (elements) disposed therein.

For example, the inlet 801 may be a through hole (port) formed in the rear part 23. In an embodiment in which the controller 383 is disposed in the extending part 36, the inlets 803 may be omitted. The inlet(s) 805 may be formed in only one of the upper wall and the lower wall of the extending part 36, or may be omitted. Because the fan 43 is a centrifugal fan, it is preferable that the outlets 807 are located radially outward of the fan 43. The outlets 807, however, may be disposed in (at) other positions. In a modified embodiment in which an axial fan is employed, for example, the outlets 807 may be formed in the lower wall of the second housing part 32.

The material, shape, position of the partition 81 may be appropriately changed. For example, the partition 81 may be formed of a different kind of elastic element (e.g. a synthetic resin/polymer foam), in place of elastomer. The partition 81 may be shaped in a simple annular form, rather than a tapered cylindrical form. The partition 81 may be integrally formed with the outer housing 2, or may be a member that is formed separately from the inner housing 3 and the outer housing 2. Further, the partition 81 may be disposed in (at) any position between the inlets 803, 804, 805 and the outlets 807. However, it may be preferable that the partition 81 is disposed as close as possible to the outlets 807. Although the partition 81 need not completely isolate (i.e. completely prohibit communication of the air between) the rear space, in which the inlets 803, 804, 805 are located, and the front space, in which the outlets 807 are located, it may be preferable that gaps between the partition 81 and inner housing 3 and between the partition 81 and the outer housing 2 are made as small as possible.

The material, shape, position of the closing member 83 may be appropriately changed. For example, the closing member 83 may be formed of a different kind of elastic element (e.g. a synthetic resin/polymer foam), in place of elastomer. The closing member 83 may be formed as a separate member from the inner housing 3, and may be disposed to cover the gap or fitted in the gap.

The structure of the clamping mechanism 60 (for example, the shapes, arrangements and support structures of the clamp shaft 61 and the clamp spring 65, and the components, shape, arrangement and support structure of the lock mechanism 7) may be appropriately changed. For example, a mechanism may be employed that is configured to hold the clamp shaft 61 in the clamp position using at least one ball, in place of the clamp members 71. The lever 77, 770 and the rotary shaft 78, 780 may be changed in accordance with the change in the clamp mechanism 60. Further, the clamp mechanism 60 may be omitted, and the clamp shaft 61 may be secured to the spindle 5 using a screw.

The structure of the push-down mechanism 67 (the shape, arrangement and support structure of the push-down sleeve 671, and a type of the biasing spring 675, for example) may be appropriately changed. Further, the push-down mechanism 67 may be omitted in some aspects of the present teachings.

The structures (the shape, support structure, etc.) of the spindle 5, the motor 41 and the transmitting mechanism 45 may be appropriately changed. For example, in the above-described embodiment, the tool mounting part 51 has the recess 351 that corresponds to the protruding part 911 of the tool accessory 91, so that the tool accessory 91 is secured to the tool mounting part 51 in a state in which the inclined surface 913 is in abutment with the inclined surface 513 of the tool mounting part 51. However, the tool mounting part 51 may have a planar lower surface, to (on) which a tool accessory having a planar upper surface is secured. Further, the motor 41 may be an AC motor powered by a commercial AC power source via a power cord, instead of by the battery. The motor 41 may be housed within the grip part (the central part 22) of the housing 10 such that the rotational axis A2 of the output shaft 415 is orthogonal to the driving axis A1. Moreover, although the transmitting mechanism 45 of the above-described embodiment includes an eccentric shaft 451, a drive (ball) bearing 456, and an oscillating arm (fork) 458, the mechanism for converting the rotational output of the output shaft 415 into pivotal oscillating motion of the spindle 5 is not particularly limited and may be modified without departing from the scope of the present teachings. For example, the drive bearing 456 need not be a ball bearing and may be another type of bearing, such as, e.g., a needle bearing or spherical bearing. The oscillating arm 458 need not be bifurcated; it may have a single arm or an annular portion that encircles the drive bearing 456.

The following Aspects 24 to 39 are described with the aim of providing rational arrangements of at least one elastic member in a power tool having an inner housing and an outer housing. Each one of the following Aspects 24 to 39 may be employed individually or in combination with any one or more of the other aspects. Alternatively, at least one of the following Aspects 24 to 39 may be employed in combination with at least one of the oscillating multi-tools 1 of the above-described embodiment, the above-described modifications and aspects, and the claimed features.

(Aspect 24)

A power tool configured to drive a tool accessory in an oscillating manner (in a pivotal oscillating manner), the power tool comprising:

a spindle supported to be rotatable around a first axis and configured to pivotally oscillate the tool accessory that is removably mounted to a lower end portion of the spindle in an oscillation plane, the first axis defining or being in parallel to an up-down direction of the power tool;

a motor having an output shaft configured to rotate around a second axis, the second axis extending parallel to the first axis;

an oscillating arm connected to the spindle and configured to oscillate about the first axis in response to rotation of the output shaft and thereby drive the spindle with a rotary (pivotal) oscillating motion around the first axis;

an inner housing that houses the spindle, the motor and the oscillating member;

an outer housing that houses the inner housing, the outer housing being an elongate hollow body having a longitudinal axis, the longitudinal axis being orthogonal to the first and second axes and defining a front-rear direction of the power tool; and at least one first elastic member disposed between the inner housing and the outer housing, wherein the at least one first elastic member is located between the oscillation plane and an upper end of the oscillating member in the up-down direction and between the first axis and the second axis in the front-rear direction.

In the power tool of this Aspect, the output shaft of the motor and the spindle generate vibration when they are rotationally driven. To cope with this vibration, the at least one first elastic member, which is disposed between the inner housing and the outer housing, is located between the first axis of the spindle and the second axis of the output shaft in the front-rear direction, thereby effectively reducing transmission of vibration to the outer housing. Further, the at least one first elastic member is located between the oscillation plane and the upper end of the oscillating member in the up-down direction and thus in (at) a position relatively close to the oscillation plane. This arrangement can reduce wobbling (rattling) of the inner housing within the outer housing during oscillatory driving of the tool accessory. Thus, according to this Aspect, the at least one first elastic member is rationally arranged.

(Aspect 25)

The power tool as defined in Aspect 24, wherein the at least one first elastic member is disposed under the inner housing.

According to this aspect, the at least one first elastic member can be located in (at) a position closer to the oscillation plane.

(Aspect 26)

The power tool as defined in Aspects 24 or 25, wherein:
the at least one first elastic member has a cylindrical shape having an outer peripheral surface and an inner peripheral surface,
a first one of the inner housing and the outer housing is in abutment with the outer peripheral surface of the at least one first elastic member, and
a second one of the inner housing and the outer housing is in abutment with the inner peripheral surface of the at least one first elastic member.

According to this aspect, the inner housing and the outer housing can be elastically connected to be movable in multiple directions relative to each other by the first elastic member that has a simple structure.

(Aspect 27)

The power tool as defined in any one of Aspects 24 to 26, wherein:
a direction that is orthogonal to the up-down direction and the front-rear direction is defined as a left-right direction of the power tool, and
the at least one first elastic member includes a plurality of first elastic members arranged side by side in the left-right direction.

According to this Aspect, a more durable elastically connecting structure can be provided than in an embodiment in which a single first elastic member is employed.

(Aspect 28)

The power tool as defined in any one of Aspects 24 to 27, wherein:
a direction that is orthogonal to the up-down direction and the front-rear direction is defined as a left-right direction of the power tool, and
the at least one first elastic member is configured to allow the inner housing and the outer housing to move relative to each other in the up-down direction, the front-rear direction and a left-right direction.

According to this aspect, the power tool is capable of coping with vibrations in at least three directions that are orthogonal to each other.

(Aspect 29)

The power tool as defined in any one of Aspects 24 to 28, further comprising:
a clamp shaft that is disposed to be coaxial with the spindle and configured to clamp the tool accessory in cooperation with the lower end portion of the spindle;
a manually operable member (lever) for unclamping the tool accessory, the manually operable member having a support shaft that is rotatably supported by the outer housing; and
at least one second elastic member disposed between the inner housing and the support shaft,
wherein the at least one second elastic member is disposed around the support shaft.

According to this Aspect, transmission of vibration to the outer housing can be effectively reduced not only by the at least one first elastic member but also by the at least one second elastic member.

(Aspect 30)

The power tool as defined in Aspect 29, wherein:
a direction that is orthogonal to the up-down direction and the front-rear direction is defined as a left-right direction of the power tool,
the at least one second elastic member includes a plurality of second elastic members arranged on left and right sides of the first axis in the left-right direction, and
each of the second elastic members has a hollow cylindrical (annular) shape and is fitted around the support shaft.

According to this aspect, the support shaft can be held in a well-balanced (evenly-balanced) manner with an easy-to-assemble structure.

(Aspect 31)

The power tool as defined in Aspect 29 or 30, wherein:
the at least one second elastic member is configured such that the inner housing and the support shaft are movable relative to each other in the up-down direction, the front-rear direction and the left-right direction.

According to this Aspect, vibration-isolating performance can be further improved.

(Aspect 32)

The power tool as defined in any one of Aspects 29 to 31, wherein:
the manually operable member has two arms respectively connected to axial end portions of the support shaft, and
the two arms each have an engagement part that is directly fitted onto the respective axial end portions of the support shaft.

According to this aspect, the manually operable member can be easily assembled, without increasing the number of components (part count).

(Aspect 33)

The power tool as defined in Aspect 32, wherein:
the two arms are connected to each other at a single member and are configured to elastically deform such that the distance between the two arms is changeable, and
elastic deformation of the two arms is restricted by the engagement parts of the two arms being engaged with the outer housing.

According to this Aspect, an assembler can easily engage the engagement parts with the axial end portions of the support shaft by elastically deforming the arms in a direction away from each other. Furthermore, engagement between the engagement parts and the outer housing can reduce the possibility that the arms will subsequently disconnect from the support shaft.

(Aspect 34)

The power tool as defined in Aspect 33, wherein:
each of the engagement parts includes an abutment part,
each of the abutment parts is arranged radially outward of the support shaft and on the inner side (in the interior) of the outer housing,
each of the abutment parts has a first abutment surface that abuts on the outer housing and a second abutment surface that abuts on the at least one second elastic member, and
the first abutment surface and the second abutment surface are disposed opposite from each other in an axial direction of the support shaft.

According to this Aspect, the outer housing and the at least one second elastic member can be efficiently connected via the abutment part.

(Aspect 35)

The outer housing includes a grip part configured to be held by a user.

(Aspect 36)

The spindle, the motor and the oscillating arm are housed in a front part of the outer housing.

(Aspect 37)

The inner housing extends in the front-rear direction, and the spindle, the motor and the oscillating arm are housed in a front part of the inner housing.

(Aspect 38)

The front part of the inner housing includes:
a first housing part that houses the spindle;
a second housing part that houses the motor; and
a third housing part that is located rearward of the first housing part and below the second housing part and that houses the oscillating arm,
wherein the at least one first elastic member is disposed between the third housing part and the outer housing.

(Aspect 39)

The power tool further comprises at least one third elastic member disposed between a rear part of the inner housing and the outer housing.

Correspondences between the features of the above-described embodiment and the features of the Aspects 24 to 39 are as follows. The features of the above-described embodiment are merely exemplary and do not limit the features of the present invention.

The oscillating multi-tool 1 is an example of the "power tool". The spindle 5 is an example of the "spindle". The driving axis A1 is an example of the "first axis". The tool mounting part 51 is an example of the "lower end portion of the spindle". The oscillation plane P is an example of the "oscillation plane". The motor 41 and the output shaft 415 are examples of the "motor" and the "output shaft", respectively. The rotational axis A2 is an example of the "second axis". The oscillating arm 458 is an example of the "oscillating member". The inner housing 3 is an example of the "inner housing". The outer housing 2 is an example of the "outer housing". The elastic member 11 is an example of the "first elastic member". The clamp shaft 61 is an example of the "clamp shaft". The lever 77 and the rotary shaft 78 as a whole is an example of the "manually operable member". The lever 770 and the rotary shaft 780 as a whole is another example of the "manually operable member". Each of the rotary shafts 78, 780 is an example of the "support shaft". The elastic member 13 is an example of the "second elastic member". The pair of arms 771 is an example of the "pair of arms". The engagement part 772 is an example of the "engagement part". The inner flange 776 is an example of the "abutment part". The outside surface 777 and the insider surface 778 are examples of the "first abutment surface" and the "second abutment surface", respectively. The central part 22 is an example of the "grip part". The first housing part 31, the second housing part 32, and the third housing part 33 are examples of the "first housing part", "second housing part" and "third housing part", respectively. The elastic member 15 is an example of the "third elastic member".

The power tool as defined in Aspects 24 to 39 is not limited to the oscillating multi-tools 1 of the above-described embodiment, the modified embodiments or the claimed features. For example, the following modifications may be made. At least one of these modifications may be adopted in combination with at least one of the oscillating multi-tool 1 of the above-described embodiment, the above-described modifications and aspects, and the claimed features.

For example, the material, shapes, numbers, positions etc. of the elastic members 11, 13, disposed between the inner housing 3 and the outer housing 2 may be appropriately modified. Examples of employable modifications are as follows.

For example, each of the elastic members 11, 13, 15 may be formed of a material that is different from the material of the above-described embodiment. For example, rubber or a foam of a different kind of synthetic resin/polymer can be employed.

Further, only one elastic member 11 may be employed, or three or more elastic members 11 may be employed. The position(s) of the elastic member(s) 11 may be changed, as long as the position(s) is (are) between the oscillation plane P and the upper end of the oscillating arm 458 in the up-down direction, and also between the driving axis A1 and the rotation axis A2 in the front-rear direction. For example, a left elastic member 11 may be disposed over a left side surface and the lower surface of the third housing part 33, between the third housing part 33 and the front part 21. Correspondingly, a right elastic member 11 may be disposed over a right side surface and the lower surface of the third housing part 33, between the third housing part 33 and the front part 21. In such an embodiment, it may be preferable that each of the left and right elastic members 11 is disposed to form an L shape as viewed from the front or from the rear, so that the left and right elastic members 11 can efficiently cope with the vibrations in the left-right direction and the up-down direction.

The components and connecting manner of the inner housing 2 and the outer housing 3 may be appropriately changed. For example, each of the metal housing 301 and the plastic housing 302 of the inner housing 3 may have a different shape. The plastic housing 302 may be formed by connecting an upper shell and a lower shell. The outer housing 2 may be formed by connecting a left shell and a right shell. The airflow paths within the housing 10 may be different from those of the above-described embodiment. The inner housing 3 may have only the front part (the metal housing 301) that houses the spindle 5, etc. Further, the front part 30 and the rear part 38 may be connected only via the extending part 36. A single elastic element having a lower elastic modulus than the extending part 36 may be employed, in place of the elastic ribs 371.

The structure of the clamping mechanism 60 (for example, the shapes, arrangements and support structures of the clamp shaft 61 and the clamp spring 65, and the components, shape, arrangement and support structure of the lock mechanism 7) may be appropriately changed. For example, a mechanism may be employed that is configured to hold the clamp shaft 61 in the clamp position using at least one ball, in place of the clamp members 71. The lever 77, 770 and the rotary shaft 78, 780 may be changed in accordance with the change in the clamp mechanism 60. Further, the clamp mechanism 60 may be omitted, and the clamp shaft 61 may be secured to the spindle 5 using a screw.

The structure of the push-down mechanism 67 (the shape, arrangement and support structure of the push-down sleeve 671, and a type of the biasing spring 675, for example) may be appropriately changed. Further, the push-down mechanism 67 may be omitted in some aspects of the present teachings.

The structures (the shape, support structure, etc.) of the spindle 5, the motor 41 and the transmitting mechanism 45 may be appropriately changed. For example, in the above-described embodiment, the tool mounting part 51 has the recess 351 that corresponds to the protruding part 911 of the tool accessory 91, so that the tool accessory 91 is secured to the tool mounting part 51 in a state in which the inclined surface 913 is in abutment with the inclined surface 513 of the tool mounting part 51. However, the tool mounting part 51 may have a planar lower surface, to which a tool accessory having a planar upper surface is secured. In the alternative, the tool mounting part 51 may define a recess having a rounded star-shaped configuration, into which a tool accessory having protrusion with a complementary (corresponding) rounded star-shaped configuration is insertable so that the rounded star-shaped structures interlock with each other in a form-fit (shape-fit) manner. Further, the motor 41 may be an AC motor. The motor 41 may be housed within the grip part (the central part 22) of the housing 10 such that the rotational axis A2 of the output shaft 415 is orthogonal to the driving axis A1.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools that drive a tool accessory with an oscillating motion.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

DESCRIPTION OF THE REFERENCE NUMERALS

1: oscillating multi-tool, 10: housing, 11: elastic member, 13: elastic member, 15: elastic member, 2: outer housing, 20: switch holder, 203: recess, 21: front part, 215: projection, 22: central part (grip part), 23: rear part, 26: holding member, 260: light unit, 261: slide guide part, 262: rear end part, 263: support leg, 265: light-unit holding part, 266: extending part, 267: groove, 268: arm, 269: wire, 27: upper shell, 271: cylindrical part, 28: lower shell, 283: projection, 285: cylindrical part, 29: switch, 291: actuation part, 293: switching member, 294: operation part, 3: inner housing, 30: front part, 301: metal housing, 302: plastic housing, 303: left shell, 304: right shell, 31: first housing part, 311: cover, 313: recess, 32: second housing part, 321: connecting part, 33: third housing part, 335: recess, 35: cover part, 351: recess, 36: extending part, 37: elastic connection part, 371: elastic rib, 38: rear part, 381: battery mounting part, 382: controller housing part, 383: controller, 385: arm part, 386: projection, 41: motor, 415: output shaft, 43: fan, 45: transmitting mechanism, 451: eccentric shaft, 452: bearing, 453: bearing, 454: eccentric part, 456: drive bearing, 458: oscillating arm, 5: spindle, 501: bearing, 502: bearing, 51: tool mounting part, 511: recess, 513: inclined surface, 515: recess, 57: spring receiving member, 60: clamping mechanism, 61: clamp shaft, 611: shaft part, 612: groove part, 615: clamp head, 65: clamp spring, 67: push-down mechanism, 671: push-down sleeve, 673: large-diameter part, 674: lower end surface, 675: biasing spring, 676: spring receiving member, 7: lock mechanism, 71: clamp member, 717: ridge part, 718: elastic ring, 73: holder, 731: insertion hole, 733: holding recess, 735: spring receiving part, 737: abutment part, 75: collar, 751: bearing, 753: groove, 77, 770: lever, 771: arm, 772; engagement part, 773 circular plate part, 774 cylindrical part, 775: projection, 776: inner flange, 777: outside surface, 778: inside surface, 779: grip part, 78, 780: rotary shaft, 781: eccentric part, 783: engagement groove, 801: inlet, 803, 804, 805: inlet, 807: outlet, 809: outlet, 81: partition, 83: closing member, 91: tool accessory, 911: protruding part, 913: inclined surface, 93: battery, A1: driving axis, A2: rotational axis, A3: rotational axis, P: oscillation plane

What is claimed is:

1. A power tool configured to drive a tool accessory in an oscillating manner, the power tool comprising:
   a motor;
   a spindle supported to be rotatable around a driving axis and configured to pivotally oscillate the tool accessory, which is removably mounted on the spindle, using power generated by the motor;

an inner housing that houses the motor and the spindle, the inner housing having at least one airflow inlet and at least one airflow outlet;

an outer housing that houses the inner housing and is elastically connected to the inner housing via at least one elastic member to be movable relative to the inner housing; and a partition disposed between the at least one airflow inlet and the at least one airflow outlet, the partition dividing a space defined between the inner housing and the outer housing into a first airflow space and a second airflow space, wherein the at least one airflow outlet is disposed in the first airflow space and the at least one airflow inlet is disposed in the second airflow space.

2. The power tool as defined in claim 1, wherein the partition is attached to the inner housing.

3. The power tool as defined in claim 1, wherein the partition is integrally formed with the inner housing.

4. The power tool as defined in claim 3, wherein the partition is formed of an elastic element configured to deform under pressure.

5. The power tool as defined in claim 4, wherein:
the motor has an output shaft, and
the spindle and the motor are arranged such that the driving axis and a rotational axis of the output shaft extend in parallel to each other.

6. The power tool as defined in claim 5, wherein:
the inner housing is formed by connecting a plurality of members,
the power tool further comprises a closing member that is formed of an elastic element and integrally formed with the inner housing, and
the closing member at least partly closes a gap between the plurality of members.

7. The power tool as defined in claim 6, wherein the partition is formed of an elastically deformable elastomer.

8. The power tool as defined in claim 1, wherein the partition is formed of an elastic element configured to deform under pressure.

9. The power tool as defined in claim 1, wherein:
the motor has an output shaft, and
the spindle and the motor are arranged such that the driving axis and a rotational axis of the output shaft extend in parallel to each other.

10. The power tool as defined in claim 1, wherein:
the inner housing is formed by connecting a plurality of members,
the power tool further comprises a closing member that at least partly closes a gap between the plurality of members.

11. The power tool as defined in claim 10, wherein both of the partition and the closing member are integrally formed with either the inner housing or the outer housing.

12. The power tool as defined in claim 10, wherein both of the partition and the closing member are integrally formed with the inner housing.

13. The power tool as defined in claim 12, wherein the partition and the closing member are each formed of an elastic element.

14. The power tool as defined in claim 1, wherein:
the inner housing includes (i) a first end part that houses at least the spindle, and (ii) a cylindrical part that extends in a longitudinal direction of the outer housing and that has an open end and a connecting end connected to the first end part,
the at least one airflow outlet is formed in the first end part, and
the at least one airflow inlet includes at least one of a first opening of the open end of the cylindrical part and a second opening formed in a peripheral wall that defines the cylindrical part.

15. The power tool as defined in claim 14, wherein the partition is a tubular elastic element that is disposed around the cylindrical part of the inner housing.

16. The power tool as defined in claim 15, wherein the partition is integrally formed with the cylindrical part of the inner housing.

17. The power tool as defined in claim 16, wherein the partition is configured to deform under pressure.

18. The power tool as defined in claim 17, wherein:
the motor has an output shaft, and
the spindle and the motor are arranged such that the driving axis and a rotational axis of the output shaft extend in parallel to each other.

19. The power tool as defined in claim 1, wherein the partition is formed of an elastically deformable elastomer and has a tubular tapered shape that increases in circumference in a direction from a rear of the power tool towards a front of the power tool.

20. The power tool as defined in claim 19, wherein:
the power tool is an oscillating multi-tool having an elongated handle, at least one of the first and second airflow spaces being disposed inside the elongated handle,
the partition is integrally formed with the inner housing,
the inner housing includes (i) a first end part that houses at least the spindle, and (ii) a cylindrical part that extends in a longitudinal direction of the outer housing and that has an open end and a connecting end connected to the first end part,
the at least one airflow outlet is formed in the first end part,
the at least one airflow inlet includes at least one of a first opening of the open end of the cylindrical part and a second opening formed in a peripheral wall that defines the cylindrical part, and
the partition surrounds the cylindrical part of the inner housing.

* * * * *